United States Patent
Nahr

(10) Patent No.: US 11,347,964 B2
(45) Date of Patent: May 31, 2022

(54) HARDWARE CIRCUIT

(71) Applicant: RENESAS ELECTRONICS CORPORATION, Tokyo (JP)

(72) Inventor: Matthias Nahr, Duesseldor (DE)

(73) Assignee: RENESAS ELECTRONICS CORPORATION, Tokyo (JP)

(*) Notice: Subject to any disclaimer, the term of this patent is extended or adjusted under 35 U.S.C. 154(b) by 231 days.

(21) Appl. No.: 16/637,622

(22) PCT Filed: Aug. 7, 2017

(86) PCT No.: PCT/EP2017/069927
§ 371 (c)(1),
(2) Date: Feb. 7, 2020

(87) PCT Pub. No.: WO2019/029785
PCT Pub. Date: Feb. 14, 2019

(65) Prior Publication Data
US 2020/0257930 A1    Aug. 13, 2020

(51) Int. Cl.
*G06K 9/62* (2022.01)
*G06F 7/523* (2006.01)
(Continued)

(52) U.S. Cl.
CPC .......... *G06K 9/6217* (2013.01); *G06F 7/523* (2013.01); *G06K 9/628* (2013.01); *G06N 3/08* (2013.01); *G06V 10/955* (2022.01); *G06V 20/56* (2022.01)

(58) Field of Classification Search
CPC ............ G06K 9/6217; G06K 9/00791; G06K 9/00986; G06K 9/628; G06F 7/523;
(Continued)

(56) References Cited

U.S. PATENT DOCUMENTS 5,636,327 A * 6/1997 Nakahira ........... G06K 9/00986
706/41
5,835,529 A * 11/1998 Koga .................. H04L 27/0012
370/479

(Continued)

OTHER PUBLICATIONS

Taesik NA et al., "Speeding up Convolutional Neural Network Training with Dynamic Precision Scaling and Flexible Multiplier-Accumulator", Low Power Electronics and Design, ACM, Aug. 8, 2016 (Aug. 8, 2016), pp. 58-63.

(Continued)

*Primary Examiner* — Qun Shen
(74) *Attorney, Agent, or Firm* — McDermott Will & Emery LLP

(57) ABSTRACT

A hardware circuit in which integer numbers are used to represent fixed-point numbers having an integer part and a fractional part is disclosed. The hardware circuit comprises a multiply-accumulate unit configured to perform convolution operations using input data and weights and, in dependence thereon, to generate an intermediate result. The hardware circuit comprises a bias bit shifter configured to shift a bias value bitwise by a bias shift value so as to provide a bit-shifted bias value, a carry bit shifter configured to shift a carry value bitwise by a carry shift value so as to provide a bit-shifted carry value, an adder tree configured to add the intermediate result, the bit-shifted bias value and the bit-shifted carry value so as to provide a multiple-accumulate result and a multiply-accumulate bit shifter configured to shift the multiple-accumulate result bitwise by a multiply-accumulate shift value) to provide a bit-shifted multiply-accumulate result.

20 Claims, 36 Drawing Sheets

(51) Int. Cl.
*G06N 3/08* (2006.01)
*G06V 10/94* (2022.01)
*G06V 20/56* (2022.01)

(58) Field of Classification Search
CPC ........ G06N 3/08; G06V 10/955; G06V 20/56; G06V 10/454; G06V 10/82
See application file for complete search history.

(56) References Cited

U.S. PATENT DOCUMENTS

| | | | | |
|---|---|---|---|---|
| 5,951,628 | A * | 9/1999 | Pan | G06F 17/15 708/517 |
| 2004/0267857 | A1* | 12/2004 | Abel | G06F 9/30036 712/E9.071 |
| 2005/0278512 | A1* | 12/2005 | Ehlig | G06F 9/30065 712/228 |
| 2014/0172226 | A1* | 6/2014 | Goerick | B60T 7/22 701/28 |
| 2016/0026912 | A1 | 1/2016 | Falcon et al. | |
| 2016/0328645 | A1* | 11/2016 | Lin | G06N 3/063 |
| 2017/0220929 | A1* | 8/2017 | Rozen | G06N 3/08 |
| 2017/0228645 | A1* | 8/2017 | Wang | G06N 3/084 |

OTHER PUBLICATIONS

Denis A. Gudovskiy et al., "ShiftCNN: Generalized Low-Precision Architecture for Inference of Convolutional Neural Networks", Jun. 8, 2017 (Jun. 8, 2017), pp. 1-8.

Philipp Matthias Gysel, "Ristretto: Hardware-Oriented Approximation of Convolutional Neural Networks", May 20, 2016 (May 20, 2016), Chapters 4-7.

Rodrigo Martins Da Silva et al., "Reconfigurable MAC-Based Architecture for Parallel Hardware Implementation on FPGAs of Artificial Neural Netwrks Using Fractional Fixed Point Representation", Sep. 14, 2009 (Sep. 14, 2009), ECCV 2016 Conference, pp. 475-484.

International Search Report issued in corresponding International Patent Application No. PCT/EP2017/069927, dated Apr. 12, 2018.

Notification Concerning Transmittal of Copy of International Preliminary Report on Patentability issued in International Patent Application No. PCT/EP2017/069927, dated Feb. 20, 2020.

* cited by examiner

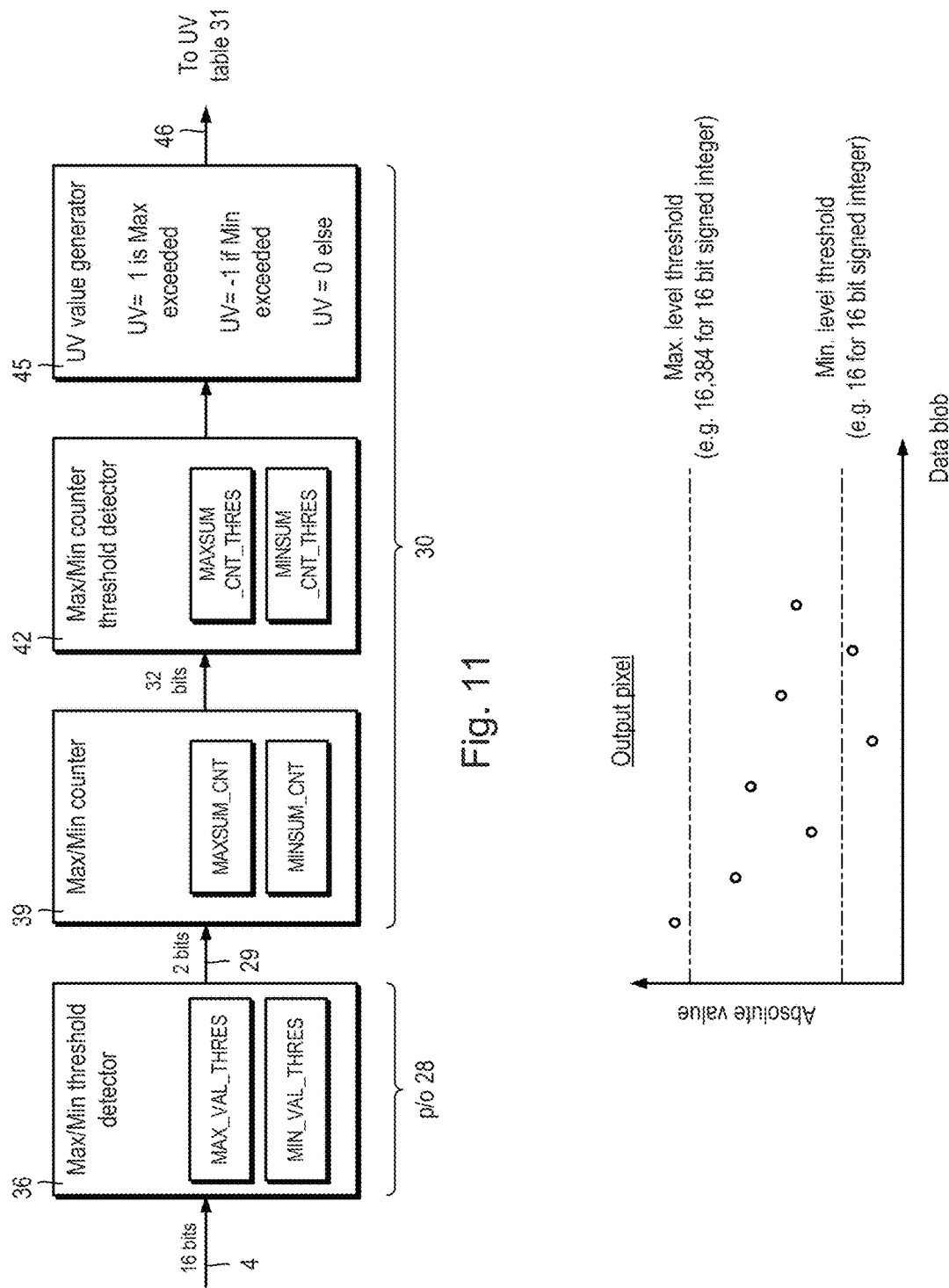

Init for standard convolution

| Shift Register Index | Bias upshift [5 bit] | Carry upshift [6 bit] | Conv. Downshift [5 bit] | UV table [2 bit] | Frac.Pos. table [6 bit] |
|---|---|---|---|---|---|
| 0 | 15 | 15 | 15 | 0 | 10 |
| 1 | 15 | 15 | 15 | 0 | 10 |
| 2 | 15 | 15 | 15 | 0 | 10 |
| 3 | 15 | 15 | 15 | 0 | 10 |
| 4 | 15 | 15 | 15 | 0 | 10 |
| 5 | 15 | 15 | 15 | 0 | 10 |
| ... | ... | ... | ... | ... | ... |
| 127 | | | | | |

Fig. 13a

Overflow in second layer identified

| Shift Register Index | Bias upshift [5 bit] | Carry upshift [6 bit] | Conv. Downshift [5 bit] | UV table [2 bit] | Frac.Pos. table [6 bit] |
|---|---|---|---|---|---|
| 0 | 15 | 15 | 15 | 0 | 10 |
| 1 | 15 | 15 | 15 | 1 | 10 |
| 2 | 15 | 15 | 15 | 0 | 10 |
| 3 | 15 | 15 | 15 | 0 | 10 |
| 4 | 15 | 15 | 15 | 0 | 10 |
| 5 | 15 | 15 | 15 | 0 | 10 |
| ... | ... | ... | ... | ... | ... |
| 127 | | | | | |

Fig. 13b

Correct shift at the end of image processing

| Shift Register Index | Bias upshift [5 bit] | Carry upshift [6 bit] | Conv. Downshift [5 bit] | UV table [2 bit] | Frac.Pos. table [6 bit] |
|---|---|---|---|---|---|
| 0 | 15 | 15 | 15 | 0 | 10 |
| 1 | 15 | 16 | 16 | 0 | 9 |
| 2 | 14 | 15 | 15 | 0 | 9 |
| 3 | 14 | 15 | 15 | 0 | 9 |
| 4 | 14 | 15 | 15 | 0 | 9 |
| 5 | 14 | 15 | 15 | 0 | 9 |
| ... | ... | ... | ... | ... | ... |
| 127 | | | | | |

Fig. 13c

Underflow in fourth layer identified

| Shift Register Index | Bias upshift [5 bit] | Carry upshift [6 bit] | Conv. Downshift [5 bit] | UV table [2 bit] | Frac.Pos. table [6 bit] |
|---|---|---|---|---|---|
| 0 | 15 | 15 | 15 | 0 | 10 |
| 1 | 15 | 16 | 16 | 0 | 9 |
| 2 | 14 | 15 | 15 | 0 | 9 |
| 3 | 14 | 15 | 15 | −1 | 9 |
| 4 | 14 | 15 | 15 | 0 | 9 |
| 5 | 14 | 15 | 15 | 0 | 9 |
| ... | ... | ... | ... | ... | ... |
| 127 | | | | | |

Fig. 13d

Correct shifts at the end of image processing

| Shift Register Index | Bias upshift [5 bit] | Carry upshift [6 bit] | Conv. Downshift [5 bit] | UV table [2 bit] | Frac.Pos. table [6 bit] |
|---|---|---|---|---|---|
| 0 | 15 | 15 | 15 | 0 | 10 |
| 1 | 15 | 16 | 16 | 0 | 9 |
| 2 | 14 | 15 | 15 | 0 | 9 |
| 3 | 14 | 14 | 14 | 0 | 10 |
| 4 | 15 | 15 | 15 | 0 | 10 |
| 5 | 15 | 15 | 15 | 0 | 10 |
| ... | ... | ... | ... | ... | ... |
| 127 | | | | | |

Fig. 13e

Commandlist

S1 { Init general Picture registers
S2 { Init OCFP table with default values

S3 { Setup registers for Layer 1 (set weights, ...)
S4 { Setup shift registers for Layer 1, based on OCFP table
S5 { Execute processing of Layer 1
S6 { Write UV-flag to index 0 in UV table S3 { Setup registers for Layer 2
S4 { Setup shift registers for Layer 2, based on OCFP table
S5 { Execute processing of Layer 2
S6 { Write UV-flag to index 1 in UV table

...

S3 { Setup registers for Layer 6
S4 { Setup shift registers for Layer 6, based on OCFP table
S5 { Execute processing of Layer 6
S6 { Write UV-flag to index 5 in UV table S7 { Check UV table and update OCFP table All layer processing finished, start next picture (repeat the above)

Example 0: Simple example without branch and without UV change

| Layer | WFP | BFP | ICFP0 | ICFP1 | ICFP2 | ICFP3 | OCFP 6bit signed | UV 2bit signed | New OCFP | 3DCFP | input shift up 0 | input shift up 1 | input shift up 2 | input shift up 3 | SFTM | SFTB | SFTC |
|---|---|---|---|---|---|---|---|---|---|---|---|---|---|---|---|---|---|
| 0 | 15 | | | | | | 10 | 0 | 10 | | | | | | | | |
| 1 | 15 | 10 | 10 | 10 | 10 | 10 | 10 | 0 | 10 | 10 | 0 | 0 | 0 | 0 | 15 | 15 | 15 |
| 2 | 15 | 10 | 10 | 10 | 10 | 10 | 10 | 0 | 10 | 10 | 0 | 0 | 0 | 0 | 15 | 15 | 15 |
| 3 | 15 | 10 | 10 | 10 | 10 | 10 | 10 | 0 | 10 | 10 | 0 | 0 | 0 | 0 | 15 | 15 | 15 |
| 4 | 15 | 10 | 10 | 10 | 10 | 10 | 10 | 0 | 10 | 10 | 0 | 0 | 0 | 0 | 15 | 15 | 15 |
| 5 | 15 | 10 | 10 | 10 | 10 | 10 | 10 | 0 | 10 | 10 | 0 | 0 | 0 | 0 | 15 | 15 | 15 |
| 6 | 15 | 10 | 10 | 10 | 10 | 10 | 10 | 0 | 10 | 10 | 0 | 0 | 0 | 0 | 15 | 15 | 15 |

Fig. 15b

Example 1: Example without branch and without UV change

| Layer | WFP | BFP | ICFP0 | ICFP1 | ICFP2 | ICFP3 | OCFP 6bit signed | UV 2bit signed | New OCFP | 3DCFP | input shift up 0 | input shift up 1 | input shift up 2 | input shift up 3 | SFTM | SFTB | SFTC |
|---|---|---|---|---|---|---|---|---|---|---|---|---|---|---|---|---|---|
| 0 | 15 | | | | | | 15 | 0 | 15 | | | | | | | | |
| 1 | 15 | 15 | 15 | 15 | 15 | 15 | 14 | 0 | 14 | 15 | 0 | 0 | 0 | 0 | 16 | 15 | 16 |
| 2 | 15 | 15 | 14 | 14 | 14 | 14 | 13 | 0 | 13 | 14 | 0 | 0 | 0 | 0 | 16 | 14 | 16 |
| 3 | 15 | 15 | 13 | 13 | 13 | 13 | 12 | 0 | 12 | 13 | 0 | 0 | 0 | 0 | 16 | 13 | 16 |
| 4 | 15 | 15 | 12 | 12 | 12 | 12 | 11 | 0 | 11 | 12 | 0 | 0 | 0 | 0 | 16 | 12 | 16 |
| 5 | 15 | 15 | 11 | 11 | 11 | 11 | 10 | 0 | 10 | 11 | 0 | 0 | 0 | 0 | 16 | 11 | 16 |
| 6 | 15 | 15 | 10 | 10 | 10 | 10 | 9 | 0 | 9 | 10 | 0 | 0 | 0 | 0 | 16 | 10 | 16 |

Example 2: Example without branch but with UV change (overflow)

Fig. 15c

Example 3: Example without branch but with UV change (underflow)

Fig. 15d

Example 4: Example with branch but without UV change

| Layer | WFP | BFP | ICFP0 | ICFP1 | ICFP2 | ICFP3 | OCFP 6bit signed | UV 2bit signed | New OCFP | 3DCFP | Input shift up 0 | Input shift up 1 | Input shift up 2 | Input shift up 3 | SFTM | SFTB | SFTC |
|---|---|---|---|---|---|---|---|---|---|---|---|---|---|---|---|---|---|
| 0 | | | | | | | 15 | 0 | 15 | | | | | | | | |
| 1 | 15 | 15 | 16 | 16 | 16 | 16 | 14 | 0 | 14 | 14 | 0 | 0 | 0 | 0 | 16 | 15 | 16 |
| 2 | 15 | 15 | 16 | 16 | 16 | 16 | 13 | 0 | 13 | 13 | 0 | 0 | 0 | 0 | 16 | 14 | 16 |
| 3 | 15 | 15 | 16 | 16 | 16 | 16 | 12 | 0 | 12 | 12 | 0 | 0 | 0 | 0 | 16 | 13 | 16 |
| 4 | 15 | 15 | 16 | 16 | 16 | 16 | 13 | 0 | 13 | 13 | 0 | 0 | 0 | 0 | 16 | 14 | 16 |
| 5 | 15 | 15 | 16 | 16 | 16 | 16 | 12 | 0 | 12 | 12 | 0 | 0 | 0 | 0 | 16 | 13 | 16 |
| 6 | 15 | 15 | 16 | 16 | 16 | 16 | 11 | 0 | 11 | 11 | 0 | 0 | 0 | 0 | 16 | 12 | 16 |

Fig. 15e

Example 5: Example with branch and with UV change before branch (overflow)

| Layer | WFP | BFP | ICFP0 | ICFP1 | ICFP2 | ICFP3 | OCFP 6bit signed | UV 2bit signed | New OCFP | 3DCFP | Input shift up 0 | Input shift up 1 | Input shift up 2 | Input shift up 3 | SFTM | SFTB | SFTC |
|---|---|---|---|---|---|---|---|---|---|---|---|---|---|---|---|---|---|
| 0 | | | | | | | 15 | 0 | 15 | | | | | | | | |
| 1 | 15 | 15 | 16 | 16 | 16 | 16 | 14 | 1 | 13 | 13 | 0 | 0 | 0 | 0 | 17 | 15 | 17 |
| 2 | 15 | 15 | 16 | 16 | 16 | 16 | 13 | 0 | 12 | 12 | 0 | 0 | 0 | 0 | 16 | 13 | 16 |
| 3 | 15 | 15 | 16 | 16 | 16 | 16 | 12 | 0 | 11 | 11 | 0 | 0 | 0 | 0 | 16 | 12 | 16 |
| 4 | 15 | 15 | 16 | 16 | 16 | 16 | 13 | 0 | 12 | 12 | 0 | 0 | 0 | 0 | 16 | 13 | 16 |
| 5 | 15 | 15 | 16 | 16 | 16 | 16 | 12 | 0 | 11 | 11 | 0 | 0 | 0 | 0 | 16 | 12 | 16 |
| 6 | 15 | 15 | 16 | 16 | 16 | 16 | 11 | 0 | 10 | 10 | 0 | 0 | 0 | 0 | 16 | 11 | 16 |

Fig. 15f

Example 6: Example with branch and with UV change before branch (underflow)

| Layer | WFP | BFP | ICFP0 | ICFP1 | ICFP2 | ICFP3 | OCFP 6bit signed | UV 2bit signed | New OCFP | 3DCFP | Input shift up 0 | Input shift up 1 | Input shift up 2 | Input shift up 3 | SFTM | SFTB | SFTC |
|---|---|---|---|---|---|---|---|---|---|---|---|---|---|---|---|---|---|
| 0 | | | | | | | 15 | 0 | 15 | | | | | | | | |
| 1 | 15 | 15 | 15 | 15 | 15 | 15 | 14 | -1 | 15 | 15 | 0 | 0 | 0 | 0 | 15 | 15 | 15 |
| 2 | 15 | 15 | 14 | 14 | 14 | 14 | 13 | 0 | 14 | 15 | 0 | 0 | 0 | 0 | 16 | 15 | 16 |
| 3 | 15 | 15 | 13 | 13 | 13 | 13 | 12 | 0 | 13 | 14 | 0 | 0 | 0 | 0 | 16 | 14 | 16 |
| 4 | 15 | 15 | 14 | 14 | 14 | 14 | 13 | 0 | 13 | 14 | 0 | 0 | 0 | 0 | 16 | 15 | 16 |
| 5 | 15 | 15 | 13 | 13 | 13 | 13 | 12 | 0 | 12 | 13 | 0 | 0 | 0 | 0 | 16 | 14 | 16 |
| 6 | 15 | 15 | 12 | 12 | 12 | 12 | 11 | 0 | 12 | 13 | 0 | 0 | 0 | 0 | 16 | 13 | 16 |

Fig. 15g

Example 7: Example with branch and with UV change in branch (overflow)

| Layer | WFP | BFP | ICFP0 | ICFP1 | ICFP2 | ICFP3 | OCFP 6bit signed | UV 2bit signed | New OCFP | 3DCFP | Input shift up 0 | Input shift up 1 | Input shift up 2 | Input shift up 3 | SFTM | SFTB | SFTC |
|---|---|---|---|---|---|---|---|---|---|---|---|---|---|---|---|---|---|
| 0 | | | | | | | 15 | 0 | 15 | | | | | | | | |
| 1 | 15 | 15 | 15 | 15 | 15 | 15 | 14 | 0 | 14 | 15 | 0 | 0 | 0 | 0 | 16 | 15 | 16 |
| 2 | 15 | 15 | 14 | 14 | 14 | 14 | 13 | 1 | 12 | 15 | 0 | 0 | 0 | 0 | 17 | 14 | 17 |
| 3 | 15 | 15 | 13 | 13 | 13 | 13 | 12 | 0 | 11 | 13 | 0 | 0 | 0 | 0 | 16 | 12 | 16 |
| 4 | 15 | 15 | 14 | 14 | 14 | 14 | 13 | 0 | 13 | 14 | 0 | 0 | 0 | 0 | 16 | 14 | 16 |
| 5 | 15 | 15 | 13 | 13 | 13 | 13 | 12 | 0 | 12 | 13 | 0 | 0 | 0 | 0 | 16 | 13 | 16 |
| 6 | 15 | 15 | 12 | 12 | 12 | 12 | 11 | 0 | 10 | 12 | 0 | 0 | 0 | 0 | 16 | 11 | 16 |

Fig. 15h

Example 8: Example with branch and with UV change in branch (underflow)

| Layer | WFP | BFP | ICFP0 | ICFP1 | ICFP2 | ICFP3 | OCFP 6bit signed | UV 2bit signed | New OCFP | 3DCFP | input shift up 0 | input shift up 1 | input shift up 2 | input shift up 3 | SFTM | SFTB | SFTC |
|---|---|---|---|---|---|---|---|---|---|---|---|---|---|---|---|---|---|
| 0 | | | | | | | 15 | 0 | 15 | | | | | | | | |
| 1 | 15 | 15 | 16 | 16 | 16 | 16 | 14 | 0 | 14 | 15 | 0 | 0 | 0 | 0 | 16 | 15 | 16 |
| 2 | 15 | 15 | 15 | 14 | 15 | 14 | 13 | -1 | 14 | 14 | 0 | 0 | 0 | 0 | 15 | 14 | 15 |
| 3 | 15 | 15 | 15 | 15 | 15 | 15 | 12 | 0 | 13 | 14 | 0 | 0 | 0 | 0 | 16 | 14 | 16 |
| 4 | 15 | 15 | 14 | 14 | 14 | 14 | 13 | 0 | 13 | 13 | 0 | 0 | 0 | 0 | 16 | 13 | 16 |
| 5 | 15 | 15 | 13 | 13 | 13 | 13 | 12 | 0 | 12 | 12 | 0 | 0 | 0 | 0 | 16 | 13 | 16 |
| 6 | 15 | 15 | 12 | 12 | 12 | 12 | 11 | 0 | 11 | 11 | 0 | 0 | 0 | 0 | 16 | 12 | 16 |

Fig. 15i

Example 9: Example with merge but without UV change

| Layer | WFP | BFP | ICFP0 | ICFP1 | ICFP2 | ICFP3 | OCFP 6bit signed | UV 2bit signed | New OCFP | 3DCFP | input shift up 0 | input shift up 1 | input shift up 2 | input shift up 3 | SFTM | SFTB | SFTC |
|---|---|---|---|---|---|---|---|---|---|---|---|---|---|---|---|---|---|
| 0 | | | | | | | 15 | 0 | 15 | | | | | | | | |
| 1 | 15 | 15 | 16 | 16 | 16 | 16 | 14 | 0 | 14 | 15 | 0 | 0 | 0 | 0 | 16 | 15 | 16 |
| 2 | 15 | 15 | 15 | 15 | 15 | 15 | 13 | 0 | 13 | 14 | 0 | 0 | 0 | 0 | 16 | 14 | 16 |
| 3 | 15 | 15 | 14 | 14 | 14 | 14 | 12 | 0 | 12 | 13 | 0 | 0 | 0 | 0 | 16 | 13 | 16 |
| 4 | 15 | 15 | 13 | 13 | 13 | 13 | 11 | 0 | 11 | 12 | 0 | 0 | 0 | 0 | 16 | 12 | 16 |
| 5 | 15 | 15 | 12 | 12 | 12 | 12 | 10 | 0 | 10 | 11 | 0 | 0 | 0 | 0 | 16 | 11 | 16 |
| 6 | 15 | 15 | 11 | 11 | 11 | 11 | 9 | 0 | 9 | 10 | 0 | 0 | 0 | 0 | 16 | 10 | 16 |

Fig. 15j

Example 10: Example with merge and with UV change before branch (overflow)

| Layer | WFP | BFP | ICFP0 | ICFP1 | ICFP2 | ICFP3 | OCFP 6bit signed | UV 2bit signed | New OCFP | 3DCFP | input shift up 0 | input shift up 1 | input shift up 2 | input shift up 3 | SFTM | SFTB | SFTC |
|---|---|---|---|---|---|---|---|---|---|---|---|---|---|---|---|---|---|
| 0 | | | | | | | 15 | 0 | | | | | | | | | |
| 1 | 15 | 15 | 15 | 15 | 15 | 15 | 14 | 1 | 15 | 16 | 0 | 0 | 0 | 0 | 17 | 15 | 17 |
| 2 | 15 | 15 | 14 | 14 | 14 | 14 | 13 | 0 | 13 | 15 | 0 | 0 | 0 | 0 | 16 | 13 | 16 |
| 3 | 15 | 15 | 13 | 13 | 13 | 13 | 12 | 0 | 12 | 14 | 0 | 0 | 0 | 0 | 16 | 12 | 16 |
| 4 | 15 | 15 | 12 | 12 | 12 | 12 | 11 | 0 | 11 | 13 | 0 | 0 | -2 | 0 | 16 | 11 | 16 |
| 5 | 15 | 15 | 11 | 11 | 11 | 11 | 10 | 0 | 10 | 12 | 0 | 0 | 0 | 0 | 16 | 10 | 16 |
| 6 | 15 | 15 | 10 | 10 | 10 | 10 | 9 | 0 | 9 | 11 | 0 | 0 | 0 | 0 | 16 | 9 | 16 |

Fig. 15k

Example 11: Example with merge and with UV change before branch (underflow)

| Layer | WFP | BFP | ICFP0 | ICFP1 | ICFP2 | ICFP3 | OCFP 6bit signed | UV 2bit signed | New OCFP | 3DCFP | input shift up 0 | input shift up 1 | input shift up 2 | input shift up 3 | SFTM | SFTB | SFTC |
|---|---|---|---|---|---|---|---|---|---|---|---|---|---|---|---|---|---|
| 0 | | | | | | | 15 | 0 | | | | | | | | | |
| 1 | 15 | 15 | 15 | 15 | 15 | 15 | 14 | -1 | 15 | 16 | 0 | 0 | 0 | 0 | 15 | 15 | 15 |
| 2 | 15 | 15 | 14 | 14 | 14 | 14 | 13 | 0 | 14 | 15 | 0 | 0 | 0 | 0 | 16 | 15 | 16 |
| 3 | 15 | 15 | 13 | 13 | 13 | 13 | 12 | 0 | 13 | 14 | 0 | 0 | 0 | 0 | 16 | 14 | 16 |
| 4 | 15 | 15 | 12 | 12 | 12 | 12 | 11 | 0 | 12 | 13 | 0 | 0 | -2 | -2 | 16 | 13 | 16 |
| 5 | 15 | 15 | 11 | 11 | 11 | 11 | 10 | 0 | 11 | 12 | 0 | 0 | 0 | 0 | 16 | 12 | 16 |
| 6 | 15 | 15 | 10 | 10 | 10 | 10 | 9 | 0 | 10 | 11 | 0 | 0 | 0 | 0 | 16 | 11 | 16 |

Fig. 15l

Example 12: Example with merge and with UV change in branch (overflow)

| Layer | WFP | BFP | ICFP0 | ICFP1 | ICFP2 | ICFP3 | OCFP 6bit signed | UV 2bit signed | New OCFP | 3DCFP | Input shift up 0 | Input shift up 1 | Input shift up 2 | Input shift up 3 | SFTM | SFTB | SFTC |
|---|---|---|---|---|---|---|---|---|---|---|---|---|---|---|---|---|---|
| 0 | | | | | | | | | 15 | | | | | | | | |
| 1 | 15 | 15 | 15 | 15 | 15 | 15 | 14 | 0 | 14 | 14 | 0 | 0 | 0 | 0 | 16 | 15 | 16 |
| 2 | 15 | 15 | 14 | 14 | 14 | 14 | 13 | 1 | 12 | 14 | 0 | 0 | 0 | 0 | 17 | 14 | 17 |
| 3 | 15 | 15 | 13 | 13 | 13 | 13 | 12 | 0 | 11 | 13 | 0 | -2 | -2 | -2 | 16 | 12 | 16 |
| 4 | 15 | 15 | 12 | 12 | 12 | 12 | 11 | 0 | 10 | 11 | 0 | 0 | 0 | 0 | 16 | 11 | 16 |
| 5 | 15 | 15 | 11 | 11 | 11 | 11 | 10 | 0 | 9 | 10 | 0 | 0 | 0 | 0 | 16 | 10 | 16 |
| 6 | 15 | 15 | 10 | 10 | 10 | 10 | 9 | 0 | 8 | 9 | 0 | 0 | 0 | 0 | 16 | 9 | 16 |

Fig. 15m

Example 13: Example with merge and with UV change in branch (underflow)

| Layer | WFP | BFP | ICFP0 | ICFP1 | ICFP2 | ICFP3 | OCFP 6bit signed | UV 2bit signed | New OCFP | 3DCFP | Input shift up 0 | Input shift up 1 | Input shift up 2 | Input shift up 3 | SFTM | SFTB | SFTC |
|---|---|---|---|---|---|---|---|---|---|---|---|---|---|---|---|---|---|
| 0 | | | | | | | | | 15 | | | | | | | | |
| 1 | 15 | 15 | 15 | 15 | 15 | 15 | 14 | 0 | 14 | 14 | 0 | 0 | 0 | 0 | 16 | 15 | 16 |
| 2 | 15 | 15 | 14 | 14 | 14 | 14 | 13 | -1 | 14 | 14 | 0 | 0 | 0 | 0 | 15 | 14 | 15 |
| 3 | 15 | 15 | 13 | 13 | 13 | 13 | 12 | 0 | 13 | 13 | 0 | 0 | 0 | 0 | 16 | 14 | 16 |
| 4 | 15 | 15 | 12 | 12 | 12 | 12 | 11 | 0 | 12 | 11 | 0 | -2 | -2 | -2 | 16 | 13 | 16 |
| 5 | 15 | 15 | 11 | 11 | 11 | 11 | 10 | 0 | 11 | 10 | 0 | 0 | 0 | 0 | 16 | 12 | 16 |
| 6 | 15 | 15 | 10 | 10 | 10 | 10 | 9 | 0 | 10 | 10 | 0 | 0 | 0 | 0 | 16 | 11 | 16 |

Fig. 15n

5x5 kernel for 3x3 convolution

Fig. 19a

5x5 kernel for upper left 2x2 convolution

Fig. 19b

HARDWARE CIRCUIT

CROSS REFERENCE

This application is the U.S. National Phase under 35 U.S.C. § 371 of international Application No. PCT/EP2017/069927, filed on Aug. 7, 2017, the entire contents are hereby incorporated by reference.

FIELD OF THE INVENTION

The present invention relates to a hardware circuit, such as a hardware convolutional neural network module, in which integer numbers are used to represent fixed-point numbers having an integer part and a fractional part.

BACKGROUND

A convolutional neural network (or "CNN") can be used in image recognition to classify objects in an input image.

A CNN comprises a series of computational layers including one or more convolutional layers, each employing one or more filters (or "kernels") to extract features and produce corresponding feature maps, and one or more pooling/sub-sampling layers to down-sample images while retaining important information thereby helping to improve robustness of features to noise. The CNN may include two or more stages of convolution layers and subsequent sub-sampling layers. The first convolution layer extracts lower-level features (such as edges and lines) while later stages extract higher-level features. The CNN also includes one or more non-linear layers to signal identification of features and one or more fully connected layers which can combine high-level features presented by previous layers and classify them.

Data values propagating through convolutional neural networks can vary by several orders of magnitudes. If a CNN is implemented using processing units which handle floating-point numbers, then such variations can be easily accommodated. If, however, a CNN is implemented using processing units which use fixed-point numbers (for example in an embedded system in which the CNN is implemented in hardware), then computations can lead to values becoming saturated or, conversely, depleted. This can be particularly problematic if pixel values vary significantly (for instance, if brightness of images can suddenly change) and/or if the CNN contains many layers.

Reference is made to US2016/026912A1.

SUMMARY

According to a first aspect of the present invention there is provided a hardware circuit in which integer numbers are used to represent data in a fixed-point number format having an integer part and a fractional part. The hardware circuit comprises a multiply-accumulate unit configured to perform convolution operations using input data and weights and, in dependence thereon, to generate an intermediate result. The hardware circuit comprises a bias bit shifter configured to shift a bias value bitwise by a bias shift value so as to provide a bit-shifted bias value, a carry bit shifter configured to shift a carry value bitwise by a carry shift value so as to provide a bit-shifted carry value, an adder tree configured to add the intermediate result, the bit-shifted bias value and the bit-shifted carry value so as to provide a multiple-accumulate result and a multiply-accumulate bit shifter configured to shift the multiple-accumulate result bitwise by a multiply-accumulate shift value so as to provide a bit-shifted multiply-accumulate result. The hardware circuit comprises a post-processing stage configured to receive the bit-shifted multiply-accumulate result and, in dependence thereon, to generate output data. The hardware circuit is configured to receive a set of input data as a series of portions of data (for example, rows of data for a given channel) and, for each portion of data, to generate a corresponding portion of output data. The hardware circuit further comprises a maximum/minimum handler configured to count, in a given set of output data, first and second numbers of values of output data that exceed a first threshold or fall below a second threshold respectively and to determine whether the first number exceeds a third threshold or the second number exceeds a fourth threshold respectively and, if so, to output a first value stored in a first table indicative of whether the first number exceeds the third threshold and/or the second number exceeds the fourth threshold for the given set of input data; and a controller configured to update a second value stored in a second table to be used for the next set of input data in dependence of the first value, and to set the bias shift value, the carry shift value and the multiply-accumulate shift value in dependence on the updated second value.

Thus, the bit shifters can be used to adjust the fixed-point number format and so help reduce saturation and depletion of output values.

The circuit may be configured to handle k input channels and m output channels (where k and m are non-zero integer numbers). There may be 2, 3 or 4 input channels (i.e. k=2, 3 or 4). There may be two or more output channels, (i.e. m≥2), preferably 4, 5, 6 or 8 channels (i.e. m=4, 5, 6 or 8).

The hardware circuit may be configured to count numbers of values of output data that exceed a respective first threshold or fall below a respective second threshold for each output channel. The hardware circuit may be configured to add counted values for two or more channels.

The hardware circuit according may further comprise a bias value register arranged to provide the bias value to the bias bit shifter. The hardware circuit according may further comprise a carry value register arranged to provide the carry value to the carry bit shifter.

The hardware circuit may comprise a MAC array module comprising the multiply-accumulate unit, the bias bit shifter and the carry bit shifter.

The hardware circuit according may further comprise weights registers for providing the weights to the MAC array, input registers for providing the input data to the MAC array; and carry registers for providing carry data to the MAC array.

The post-processing stage may include a rectified linear unit module, a ranking module and/or a down sampling module. The rectified linear unit module, a ranking module and/or a down sampling module may be respectively configurable. The post-processing stage may comprise input registers.

The hardware circuit according may further comprise a command issue unit for executing a programmable script. The hardware circuit according may further comprise an interface to an external processor (that is, outside the hardware circuit), such as a host processor. The hardware circuit according may further comprise parameter registers for holding data for configuring the hardware circuit. The hardware circuit may further comprise a hardware controller, for example, for setting and resetting functional blocks, clocks and/or triggers.

The hardware circuit may be an accelerator.

According to a second aspect of the present invention there is provided a convolutional neural network module comprising the hardware circuit according to the first aspect.

The convolutional neural network module may be configured to perform semantic segmentation so as to classify objects.

According to a third aspect of the present invention there is provided an integrated circuit comprising a hardware circuit according to the first aspect or a convolutional neural network module according to the second aspect.

The integrated circuit may be a system-on-chip (SoC) or a microcontroller. The SoC or microcontroller further comprises a CPU subsystem in communication with the convolutional neural network module. The integrated circuit may further comprise memory (e.g. up to 2 MB or up to 8 MB).

According to a fourth aspect of the present invention there is provided a head unit comprising the integrated circuit according to the fourth aspect.

The head unit may be operable to receive images from a digital camera and to pass the images to the hardware circuit.

According to a fifth aspect of the present invention there is provided a system comprising the head unit according to the fourth aspect and a digital camera configured to transmit images to the head unit for processing by the hardware circuit.

The system may further comprise a communications bus for transmitting images from the digital camera to the head unit. The system may be a driver or operator assistance system, such as an advance driver assistance system or a plant or machine operator assistance system. The system may further comprise a display for the image or an augmented image comprising the image and additional information.

According to a sixth aspect of the present invention there is provided a vehicle or plant comprising the system according to the fifth aspect.

The vehicle or plant may be a motor vehicle. The motor vehicle may be a motorcycle, an automobile (sometimes referred to as a "car"), a minibus, a bus, a truck or lorry. The motor vehicle may be powered by an internal combustion engine and/or one or more electric motors.

BRIEF DESCRIPTION OF THE DRAWINGS

Certain embodiments of the present invention will now be described, by way of example, with reference to the accompanying drawings, in which:

FIG. 11 is a schematic block diagram of a level handler;
FIG. 12 illustrates detection of depletion and saturation by the level handler shown in FIG. 11;
FIGS. 13a to 13e illustrates an example of determining bit shift values used to dynamically adjust fixed-point number;
FIG. 14 illustrates a command list used in further examples;
FIGS. 15a to 15n illustrates further examples of determining bit shift values used to dynamically adjust fixed-point number;
FIG. 19a illustrates an example of a 5×5 kernel for a 3×3 convolution;
FIG. 19b illustrates an example of a 5×5 kernel for a 2×2 convolution.

DETAILED DESCRIPTION OF CERTAIN EMBODIMENTS

Introduction

Figure 1:
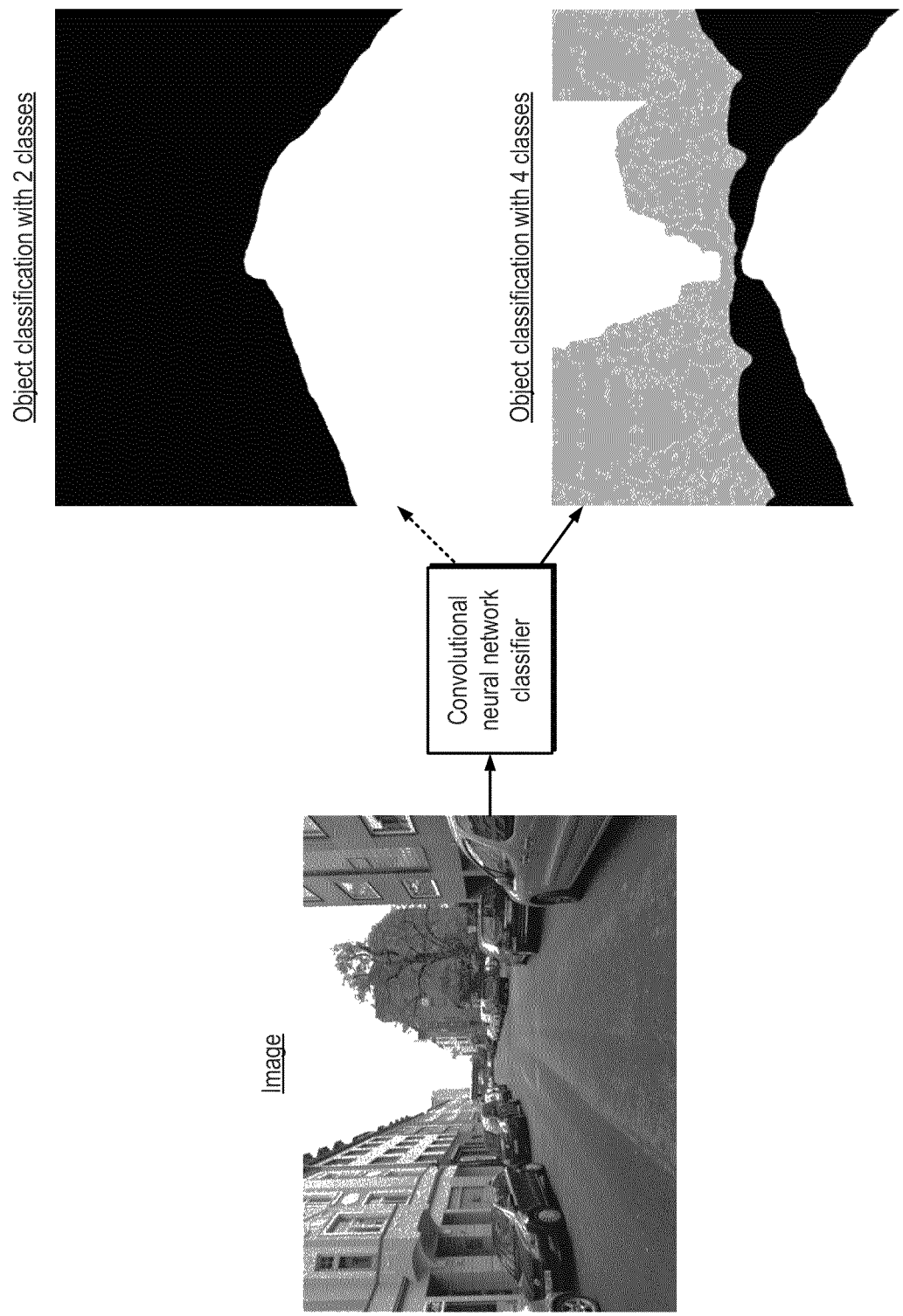
FIG. 1 shows semantic segmentation of a road scene.

Referring to FIG. 1, a convolutional neural network (CNN) classifier can be used in an advanced driver assistance system (ADAS) or autonomous car to perform semantic segmentation to classify objects in images captured by an on-board camera. Although it is possible to carryout processing in software on a processor, it is desirable to implement CNNs in automotive applications in embedded hardware so as to reduce costs and power requirements. This approach, however, presents challenges.

Figure 2:
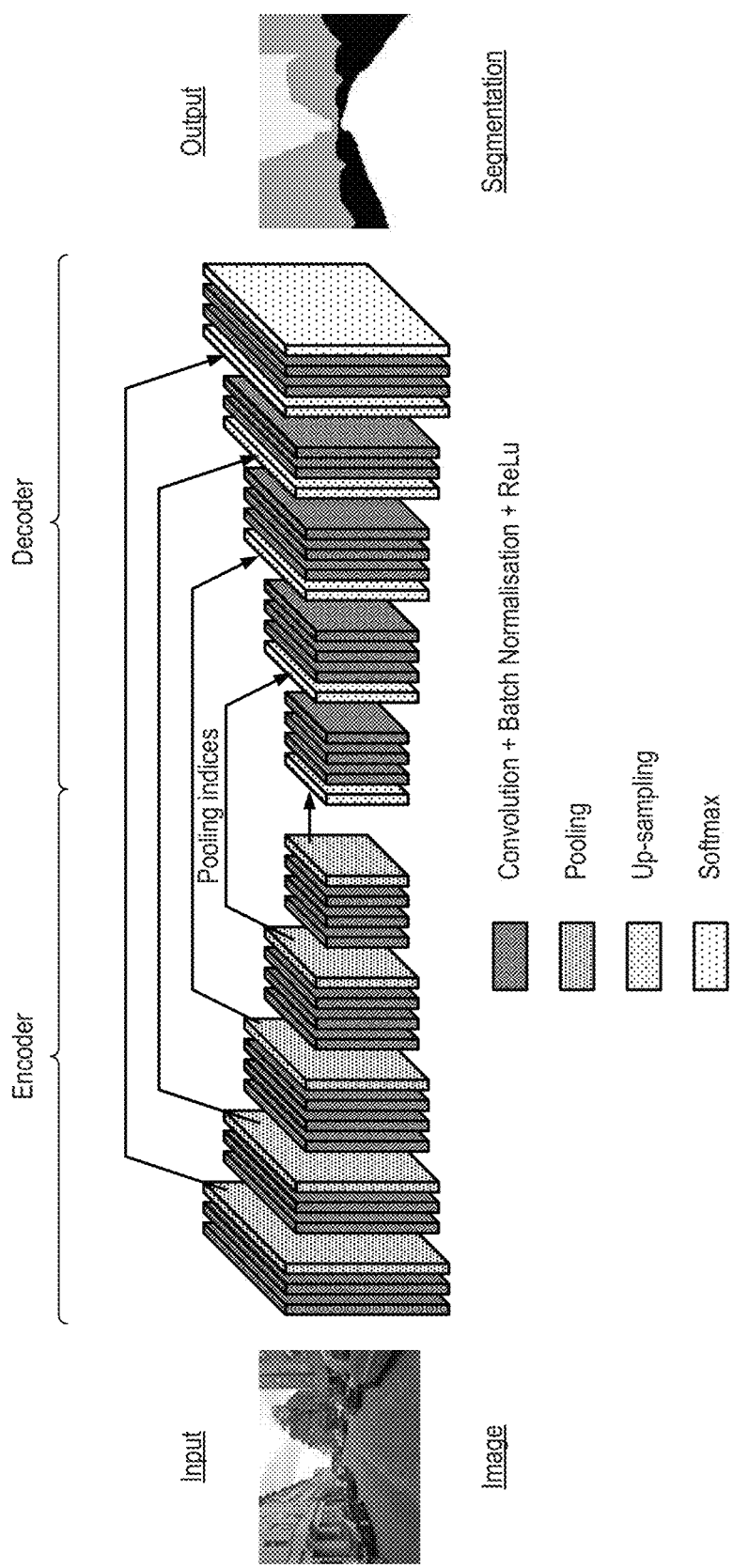
FIG. 2 illustrates a convolutional neural network (CNN) architecture.

Referring to FIG. 2, an example of a convolutional neural network architecture in the form of a convolutional encoder-decoder is shown. The convolutional encoder-decoder comprises a series of layers for convolution, batch normalisation, rectified linear units ("ReLUs"), pooling and up-sampling, and a final Softmax classifier. In this network architecture, there is no fully-connected layer. The decoder up-samples an input image using transferred pooling indices from the encoder to produce a feature map, the decoder performs convolution with a trainable filter bank to condense the feature map and the final decoder output feature maps are fed to a Softmax classifier for pixel-wise classification.

Convolutional neural networks, such as the one shown in FIG. 2, can be formed using a large number (e.g. hundreds or thousands) of multiply accumulate (MAC) units, which can be implemented in hardware using registers and control logic. The hardware is configured to handle a fixed number of widths of data, for example 8 bits or 16 bits, and numbers are represented as fixed-point integer numbers. This, however, leads to the risk of saturation or depletion, as will now be explained.

Figure 3:
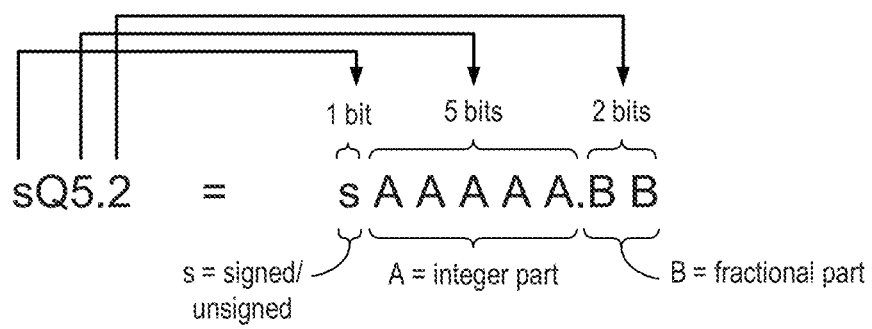
FIG. 3 illustrates a fixed-point number format.

Referring to FIG. 3, the fixed-point integer number format is illustrated. Taking the example of an 8-bit number, the number can be divided into three pails, namely a sign bit, an integer part and a fractional part. For an 8-bit number having, for example, an sQ5.2 fixed-point integer format, the integer part consists of five bits and the fractional part consists of two bits. In this case, the integer part can be used to define numbers between 0 and 31 and the fractional part can be used to define fractions, namely 0, 0.25, 0.5 and 0.75. Thus, the sQ5.2 fixed-point integer format can be used to represent numbers in the range between −31.75 and 31.75.

Determining appropriate sizes (i.e. number of bits) for the integer and fractional pails in convolutional neural networks can be problematic for two reasons.

First, convolution involves multiplication of numbers which can result in products, i.e. values, which are either very large or very small.

Figure 4:
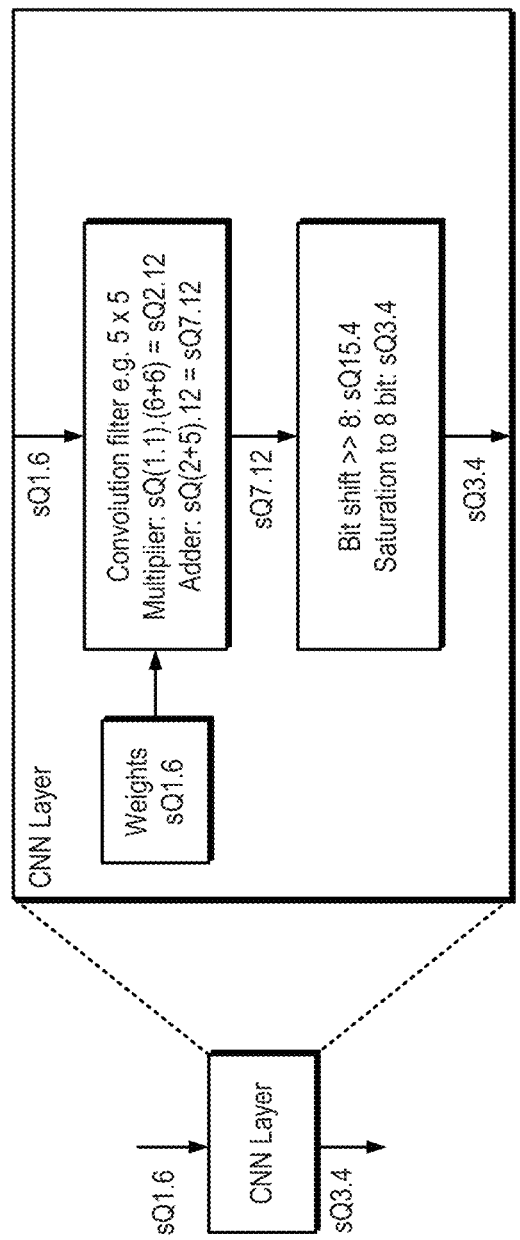
FIG. 4 is a schematic block diagram of a CNN layer.

Referring to FIG. 4, an example of a CNN layer is shown. An input image comprises an array of values in the form of sQ1.6 fixed-point integer values, i.e. the integer part consists of one bit and the fractional part consist of six bits. The image is convolved with a filter comprising, for example, a 5×5 array of weights. This involves a multiply—accumulate operation. In this operation, each sQ1.6 input value is multiplied with a corresponding sQ1.6 weight. Each multiplication step should be able to accommodate possible results by having an sQ(1+1)·(6+6)=sQ2.12 format. There are 25 multiplication steps whose results are added. To add 25 sQ2.12 numbers, the adder should be able to accommodate sQ(2+5)·12=sQ7.12 format. The result is then bit-shifted by 8 bits resulting in a value resulting in a sQ(7+8)·(12−8)=sQ15.4 and clamped to produce an 8-bit sQ3.4 number. Thus, the input and output of a CNN layer can have different number formats.

The second reason why determining the appropriate sizes for the integer and fractional parts is that the CNN graph may not be linear, i.e. may not form a single chain of CNN layers, but can be recurrent.

Figure 5:
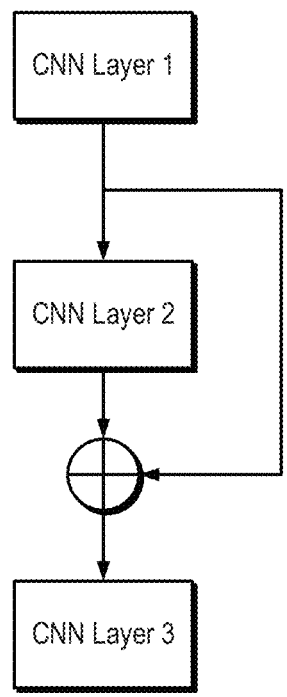
FIG. 5 is a schematic block diagram of three CNN layers.

Referring to FIG. 5, an example of part of a CNN including a recurrent connection is shown. A feature map from layer 1 is presented not only as the input to layer 2, but is also added to the feature map from layer 2 and the combined feature map is presented to layer 3. As explain earlier, the input and output of a CNN layer can have different number formats. Thus, the feature maps from layer 1 and from layer 2 may have different number formats.

Figure 6:
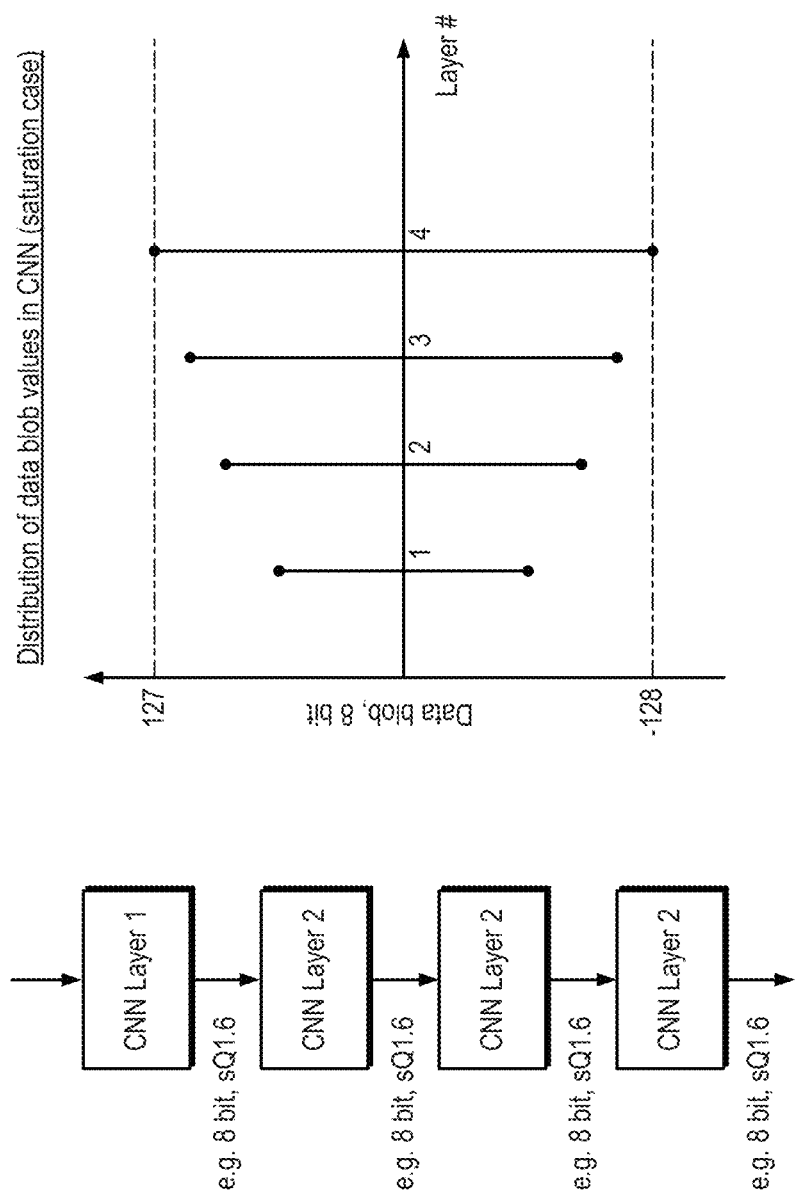
FIG. 6 illustrates saturation in a series of four CNN layers.

Referring to FIG. 6, an example of a CNN comprising a series of four CNN layers, together with a schematic plot of distribution of data blob values (i.e. the values of data passing through the network) illustrating saturation is shown. In this case, saturation can occur when CNN layer operations generally result in ever-increasing values and the sizes of the integer and fractional parts of the numbers are fixed.

Figure 7:
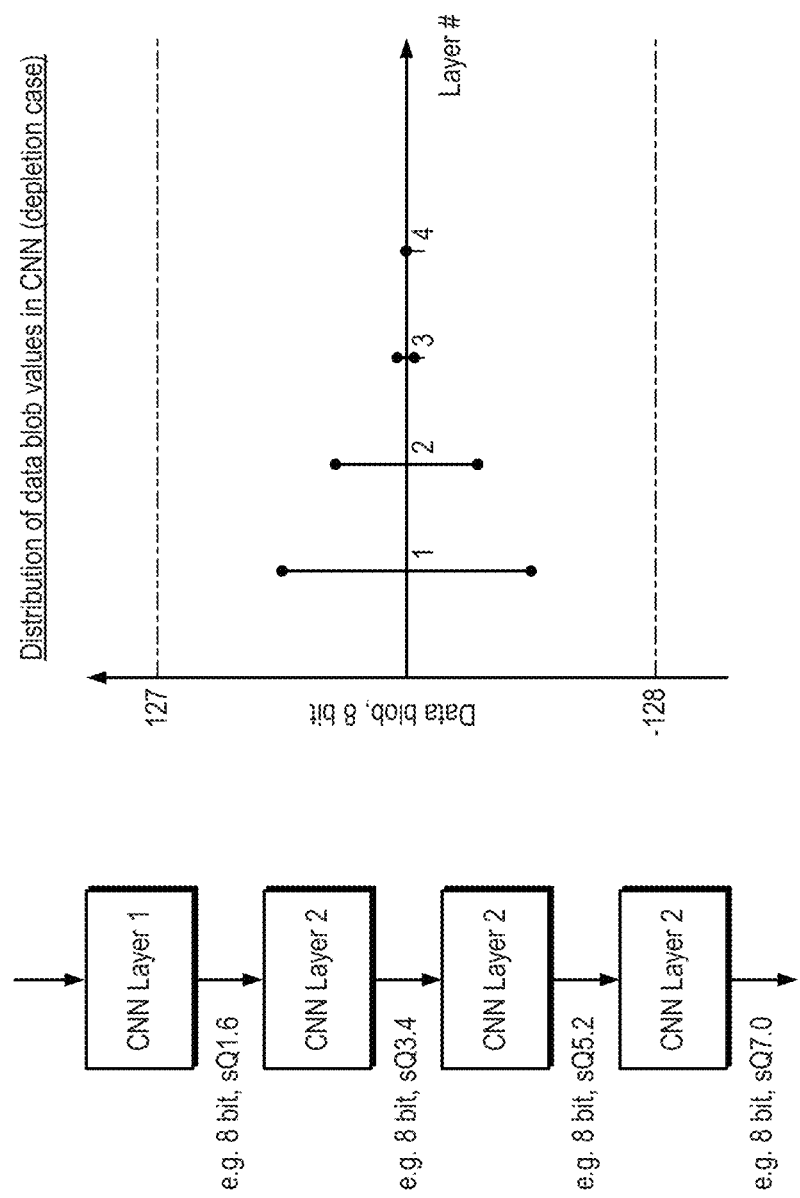
FIG. 7 illustrates depletion in a series of four CNN layers.

Referring to FIG. 7, an example of a CNN comprising a series of four CNN layers, together with a schematic plot of distribution of data blob values illustrating depletion is shown. In this case, depletion can occur when the sizes of the integer and fractional parts of the output is changed in a pre-determined way to provide an ever-larger integer part, but an input image comprises values which are smaller than expected.

Figure 8:
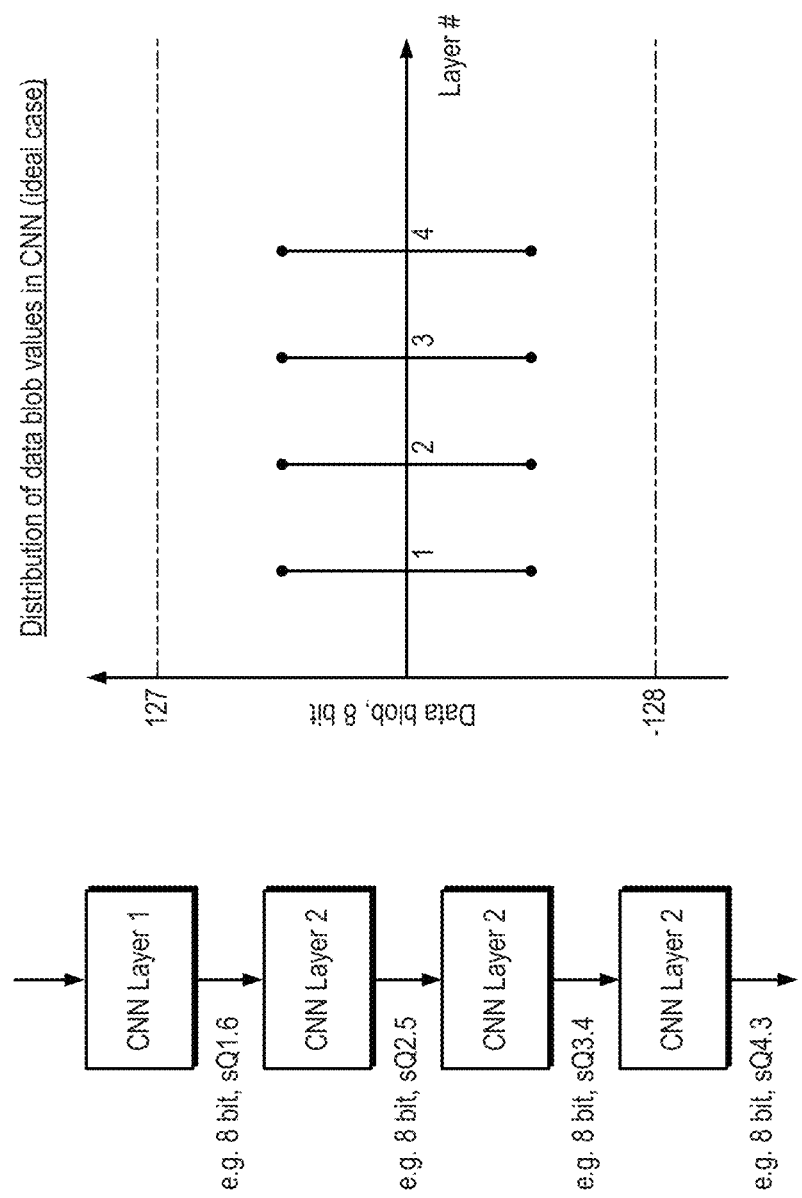
FIG. 8 illustrates a situation in which saturation and depletion are avoided in a series of four CNN layers.

Referring to FIG. 8, an example of a CNN comprising a series of four CNN layers, together with a graph of distribution of data blob values illustrating an ideal case is shown. In this case, the integer and fractional parts of the output are changed to accommodate differing sizes of integer part.

Figure 9:
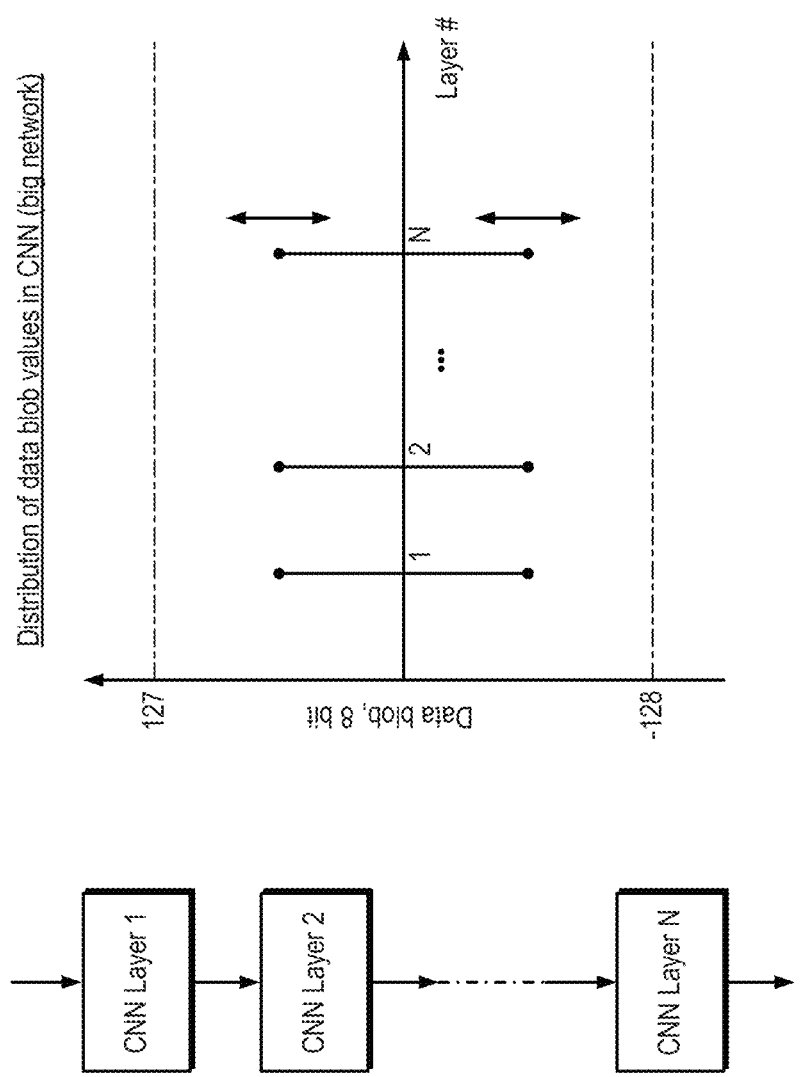
FIG. 9 illustrates data blob distribution in N CNN layers.

Referring to FIG. 9, an example of a CNN comprising a number N of CNN layers, together with a graph of distribution of data blob values illustrating is shown. In this case, the distribution of upper and lower values generally becomes larger, the larger the value number N of layers.

The present invention seeks to minimise saturation and depletion by allowing the fixed-point number format to be dynamically adapted.

Hardware CNN Module 1

Figure 10:
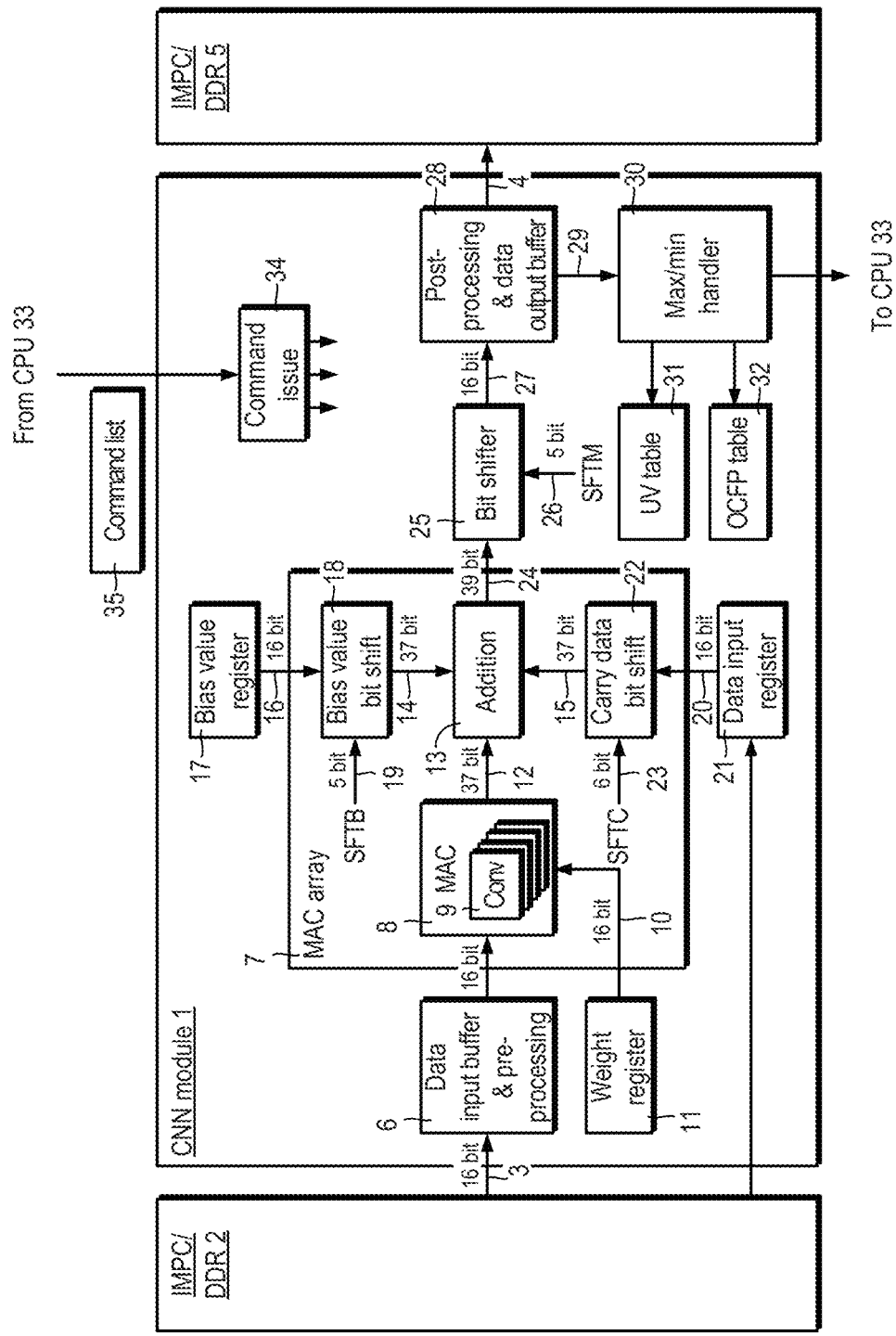
FIG. 10 is a schematic block diagram of a CNN hardware module.

Referring to FIG. 10, a hardware CNN module 1 (or "CNN accelerator") in which fixed-point number format can be dynamically adapted is shown.

The CNN module 1 receives, from memory 2, input data 3 which is divided into k channels and provides output data 4 divided into m channels to memory 5. In this case, k is 4, in particular, one for each of YUV and one for other data such as distance, and m is 8. Fewer or more input channels and/or fewer or more output channels may be used. The memory 2 can include relatively large, but slow off-chip memory (herein referred to as "DDR") and relatively small (e.g. around 2 MB), but fast on-chip memory in the form of scratchpad memory or cache memory (which is herein referred to as "IMPC").

The CNN module 1 includes a data input and pre-processing section 6 which feeds a multiply-accumulate (MAC) array module 7 which includes an array of MAC modules 8. Each MAC module 8 includes k convolution blocks 9 which each perform a p×q convolution on the input data 2 using weights 10 provided by weight registers 11. In this case, perform p=q=5.

Within each output channel, the output 12 of a MAC module 8 is fed into an adder tree 13 which adds the output 12 to bit-shifted bias and bit-shifted carry values 14, 15. The bit-shifted bias value 14 is obtained from a bias value 16 stored in a register 17 which is upshifted in bit shifter 18 according to a bias upshift value 19 (herein referred to "bias upshift" or "SFTB"). The bit-shifted carry value 15 is obtained from a carry value 20 stored in a register 21 which is upshifted in bit shifter 22 according to a carry upshift value 23 (herein referred to as "SFTC"). The output 24 of the MAC array block 7 is fed into a bit shifter 25 which down shifts the output 24 according to a MAC down shift value 26 (herein referred to as "SFTM") which results in a down-shifted output 27. Each bit shifter 18, 22, 25 is able to perform arithmetic shifts (left and right) which preserve sign without needing to store the result, i.e. it does not need to include memory. However, a bit shifter may be implemented using a shift register (not shown).

The CNN module 1 includes a post-processing and data output section 28 and a saturation/depletion handler 30 (herein also referred to as a "maximum/minimum handler" or "MAX_MIN_HANDLER"). The saturation/depletion handler 30 is provided with an update value table 31 (herein also referred to as the "UV_TABLE" or "UV table") and an output channel fractional position table 32 (herein also referred to as "OCFP_TABLE" or "OCFP table"). The output channel fractional position table 32 describes the fractional point position of output data from the CNN module 1. Values for individual CNN layers can be set using a table index.

As will be explained in more detail later, the saturation/depletion handler 30 is used detect whether the proportion of values of the output data 4 in the output channel falls outside an acceptable range and, if so, to flag the event in the UV table 31 and to adjust the OCFP table 32. This is used to set the bias upshift value 19 (i.e. STFB), carry upshift value 23 (i.e. SFTC) and the MAC down shift value 26 (i.e. STFM) for the next layer of the picture. The saturation/depletion handler 30 can issue an interrupt 32 to the host CPU 33.

The CNN module 1 includes a command issue block 34 (or "unit") is capable of executing a programmable script (herein referred to as a "command list" or "Cmdlist") 35 comprising a set of commands. The command issue block 34 performs a number of functions including setting up registers, interfacing with the host CPU 33 and adjusting bits shifts. The command issue block 34 takes the form of a processor which executes programming flow.

The update value table 31 and fractional position table 32 take the form of hardware registers and the command issue unit 34 can read and write to these tables 34, 35.

The post-processing section 28 and the maximum/minimum handler 30 includes a set of registers and counters which are used in relation to monitoring depletion and saturation, namely:

| | |
|---|---|
| MAX_CNT [m] | Counter counting occurrences when layer output value exceeds MAX_VAL_THRES (a counter for each layer) |
| MIN_CNT [m] | Counter counting occurrences when layer output value exceeds MIN_VAL_THRES (a counter for each layer) |
| MAXSUM_CNT | Sum of MAX counter values of all output channels |
| MINSUM_CNT | Sum of MIN counter values of all output channels |
| MAX_VAL_THRES | Unsigned MAX value threshold (same for each output channel) |
| MIN_VAL_THRES | Unsigned MIN value threshold (same for each output channel) |
| MAXSUM_CNT_THRES | MAXSUM counter threshold If value is exceeded, interrupt is set (if enabled) |
| MINSUM_CNT_THRES | MINSUM counter threshold If value is exceeded, interrupt is set (if enabled) |

Referring to also FIG. 11, the post-processing section 28 includes a data value threshold detector 36 having MIN_VAL_THRES and MAX_VAL_THRES registers. Whenever the thresholds are exceeded, the data value threshold detector 36 signals this finding to the max/min handler 30.

The max/min handler 30 includes a counter unit 39 includes the MINSUM_CNT and MAXSUM_CNT counters, a counter threshold detector 42 which includes the MAXSUM_CNT_THRES and MINSUM_CNT_THRES registers and an update value ("UV") generator 45.

Referring also to FIG. 12, the value threshold detector 36 provides two level comparators with configurable minimum and maximum value thresholds MIN_VAL_THRES, MAX_VAL_THRES that can be used to count the number of data blob values falling below the minimum level threshold MIN_VAL_THRES and exceeding the maximum level threshold, MAX_VAL_THRES. For a 16-bit signed integer (which can take values between −32768 and 32767). Its absolute value is compared against the threshold values. Thus, a negative value is mapped onto a positive value. The minimum value threshold MIN_VAL_THRES may be set to, for example, 16 and the maximum value threshold MAX_VAL_THRES may be set to, for example, 16384.

The counters are checked by the counter threshold detector 42 against two, other configurable minimum and maximum counter value thresholds MINSUM_CNT_THRES, MAXSUM_CNT_THRES. If either of these thresholds are exceeded, an update value UV 46 is set. UV=1 is the counter value exceeds a threshold for the maximum counter value and UV=−1 is the counter value exceeds a threshold for the minimum counter value. Thus, the monitoring circuit 1 is used to determine whether too much data is falling below the minimum value threshold MIN_VAL_THRES or above maximum value threshold MAX_VAL_THRES and, if so, to signal such a determination and adjust update value table 31.

The update value UV is stored in the UV table 31 at a given layer index. This need not be done automatically in hardware, but instead it can be executed by the command issue unit 34 which is programmable by the command list 35.

After processing a full image, the UV table 31 is used to update the OCFP table 32 which provides a reference for the fractional point position in the indexed CNN layer. This is also programmed by the command issue unit 34 since it depends on the CNN structure.

SIMPLE EXAMPLE

Operation of the command issue unit 34 will now be briefly described using a simple example.

Referring to FIG. 10, the command issue unit 34 initializes the UV and OCFP tables 31, 32. The command issue unit 34 sets up the bit shifters 18, 22, 27 using the bias upshift value 19, the carry upshift value 23 and the MAC upshift value 26. The CNN module 1 receives a data 2 for an image and the data 4 are processed by the pre-processing block 6 and the MAC array module 7 layer-by-layer. The image is bit-shifted using the MAC downshift value 26, is passed to the post processing block 28 and output to memory 5. The max/min handler 30 generates a value of UV 46. For each indexed CNN layer, the value of UV in the UV table 31 for the CNN layer is updated and the value of in the OCFP table 32 is updated according to the corresponding value in the UV table 31. The bit shift values 19, 23, 26 are updated ready for processing the next image. The process is then repeated for the next image.

Referring to FIGS. 10 and 13*a* to 13*e*, simple examples of dynamically adjusting fixed-point number format will now be described.

FIGS. 13*a* to 13*b* shows a table which includes, for each indexed CNN layer, values of bias upshift 19, carry upshift 23, and downshift 26, used by bit shifters 18, 22, 25, as well as values of UV 31 and OCFP 32.

Referring to FIG. 13*a*, the command issue unit 12 initiates the tables 13, 14 and sets the values of bias upshift 19, carry up-shift 23 and convolution down-shift 26. In this simple example, the values of UV and OCFP are set to 0 and 10 respectively for each value of shift register index and the values of bias up-shift 19, carry up-shift 23 and convolution down-shift 26 are set to 15.

A frame N is processed and the level handler 30 identifies an overflow in the second layer, i=1. Accordingly, the UV value generator 45 generates a value UV=1.

Referring to FIG. 13*b*, the command issue unit 34 updates the corresponding value (i.e. for layer i=1) in the UV table accordingly.

Referring to FIG. 13c, the command issue unit 34 decreases the fractional position by one for the corresponding level (i.e. i=1) and each subsequent level in a chain following the level in which the overflow occurred (i.e. i≥2). Thus, in this example, the value of OCFP is reduced from 10 to 9 for i≥2.

Referring still to FIG. 13c, the command issue unit 34 decreases the value of the bias upshift 19 for the subsequent levels in a chain following the level in which the overflow occurred (i.e. i≥2) from 15 to 14. The command issue unit 34 increases the values of the carry upshift and convolution downshift the second layer, i=1, namely the level in which the overflow occurred, from 15 to 16.

The level handler 30 may also identify an underflow in the fourth layer, i=3. In that case, the UV value generator 25 generates a value UV=−1.

Referring to FIG. 13d, the command issue unit 34 updates the corresponding value (i.e. for layer i=4) in the UV table accordingly.

Referring to FIG. 13e, the command issue unit 34 increases the fractional position by one for the corresponding level (i.e. i=1) and each subsequent level in a chain following the level in which the overflow occurred (i.e. i≥3). Thus, in this example, the value of OCFP is increased back up to 10 for i≥3.

Referring still to FIG. 13e, the command issue unit 34 increases the value of the bias upshift 19 for the subsequent levels in a chain following the level in which the overflow occurred (i.e. i≥3) to 15. The command issue unit 34 decreases the values of the carry upshift and convolution downshift the fourth layer, i=1, namely the level in which the underflow occurred, from 15 to 14.

Thus, for the next image, the integer part of the number is larger and the fractional part of the number is smaller for the level in which the overflow occurred and the subsequent levels in a chain up to the level in which the underflow occurred. The carry up-shift and conversion-down shift are adjusted to compensate.

FURTHER EXAMPLES

Further examples of determining bit shift values whereby it is possible to dynamically adjust fixed-point number format will now be described.

Referring to FIG. 14, a command list 35 used in the further examples is shown. The command list 35 includes a command to initialize general picture registers (step S1) and a command to initialize the UV table 31 (FIG. 10) and OCFP table 32 (FIG. 10) with default values (step S2).

The command list 35 includes a set of commands for each layer n, starting with layer 1. The command list 35 includes a command to set if registers for a given layer n (step S3), a command to set up the shift registers 6, 8, 9 (FIG. 10) for the given layer n based on the OCFP table 31 (FIG. 10) (step S4), a command to execute processing of the given layer n (step S5) and a command to write the UV value into the UV table 31 (FIG. 10) for the previous layer n−1 (step S6).

This is repeated for each layer. After the final layer, in this case layer 6, the command list 15 includes a command to check the UV table 31 (FIG. 10) and update the OCFP table 32 (FIG. 10).

The command list 35 is repeated for each picture (or "image").

FIGS. 15a to 15n show further examples of determining bit shift values 19, 23, 26 (FIG. 10) whereby it is possible to dynamically adjust fixed-point number format. In these examples, there are seven layers labelled "layer 0" to "layer 6".

For layer 1 and each subsequent layer, each table shows values of weights fractional position (WFP) which is known by the user (i.e. host CPU), bias fractional position (BFP) which is known by the user, output channel fractional position (OCFP) which is defined by the user for a given layer, $a^{th}$ input channel fractional position (ICFPa, a=0, 1, 2, 3) of input channel a defined by the user, update value (UV) of output channel fractional position which is initially set to 0 and which is changed by hardware, new output channel fractional position (new OCFP) due to overflow or underflow in picture processing, $b^{th}$ fractional position shift for input channel (SFTIb, b=0, 1, 2, 3) which is indirectly specified via input channel fractional position by the user, 3D carry fractional position (3DCFP) which is indirectly specified via OCFP, MAC shift down 26 (i.e. SFTM) which results from other inputs, BIAS shift up 19 (i.e. SFTB) which results from other inputs and 3D carry shift up 23 (i.e. SFTC) which results from other inputs.

Referring to FIG. 15a, a first further example ("example 0") of determining bit shift values 19, 23, 26 (FIG. 10) is shown in which there is no branch and no change in UV. The OCFP is set to be the same for all layers, namely to 10. As shown in FIG. 15a, there is no change in UV and so each value of new OCFP is the same as the corresponding (old) value of OCFP. Accordingly, there is no change in SFTM 26, SFFB 19 and SFTC 23.

Referring to FIG. 15b, a second further example ("example 1 of determining bit shift values 19, 23, 26 (FIG. 10) is shown again in which there is no branch and no change in UV. The OCFP is set to be different value for different for different layers, namely set to 15 to 9. As shown in FIG. 15b, there is no change in UV and so each value of new OCFP is the same as the corresponding (old) value of OCFP. Accordingly, there is no change in SFTM, SFFB and SFTC.

Referring to FIG. 15c, a third further example ("example 2") of determining bit shift values 19, 23, 26 (FIG. 10) is shown again in which there is no branch and a change in value in UV arising from an overflow. The OCFP is set to be 15, 14, 13, 12, 11, 10 and 9 for layers 0 to 6 respectively. As shown in FIG. 15c, there is a change in the value of UV to 1 in layer 2 and the value of new OCFP is reduced by 1 for layer 2 and in each subsequent layer, thereby resulting in values of 15, 14, 12, 11, 10, 9 and 8 for layers 0 to 6 respectively. Accordingly, SFTM and SFTC are increased by one from 16 to 17 in layer 2 and values of SFTB are decreased by one in layers 3 to 6, thereby resulting in values of 15, 14, 12, 11, 10 and 9 for layers 1 to 6 respectively Referring to FIG. 15d, a fourth further example ("example 3") of determining bit shift values 19, 23, 26 (FIG. 10) is shown again in which there is no branch and a change in value of UV arising from an underflow. The OCFP is set to be 15, 14, 13, 12, 11, 10 and 9 for layers 0 to 6 respectively. As shown in FIG. 15d, there is a change in value of UV to −1 in layer 2 and the value of new OCFP is increased by 1 for layer 2 and in each subsequent layer, thereby resulting in values of 15, 14, 14, 13, 12, 11 and 10 for layers 0 to 6 respectively. Accordingly, SFTM and SFTC are decreased by one from 16 to 15 in layer 2 and values of SFTB are increased by one in layers 3 to 6, thereby resulting in values of 15, 14, 14, 13, 12 and 11 for layers 1 to 6 respectively.

In the further examples described so far, the layers are processed sequentially (in a linear chain), namely 1→2→3→4→5→6. In the following example, the processing involves branches.

Referring to FIG. 15e, a fifth further example ("example 4") of determining bit shift values 19, 23, 26 (FIG. 10) is shown in which the layers split into two branches after layer 1 and join at layer 6 (i.e. 1→2→3→6 and 1→3→4→6) and in which there is no change in value of UV. The OCFP is set to be 15, 14, 13, 12, 13, 12 and 11 for layers 0 to 6 respectively. As shown in FIG. 15e there is no change in UV and so each value of new OCFP is the same as the corresponding (old) value of OCFP. Accordingly, there is no change in SFTM, SFFB and SFTC. The values of SFTM and SFTC are equal to 16 for layers 1 to 6 and the values of SFFB are 15, 14, 13, 14, 13 and 12 for layers 1 to 6 respectively.

Referring to FIG. 15f, a sixth further example ("example 5") of determining bit shift values 19, 23, 26 (FIG. 10) shown in which the layers split into two branches after layer 1 and join at layer 6 (i.e. 1→2→3→6 and 1→3→4→6) and in which there is a change in the value of UV before the branch resulting from an overflow. The OCFP is set to be 15, 14, 13, 12, 13, 12 and 11 for layers 0 to 6 respectively. As shown in FIG. 15f, there is a change in value of UV to 1 in layer 1 and the value of new OCFP is decreased by 1 for layer 1 and in each subsequent layer, thereby resulting in values of 15, 13, 12, 11, 12, 11 and 10 for layers 0 to 6 respectively. Accordingly, SFTM and SFTC are increased by one from 16 to 17 in layer 1 and values of SFTB are decreased by one in layers 2 to 6, thereby resulting in values of 15, 13, 12, 13, 12 and 11 for layers 1 to 6 respectively.

Referring to FIG. 15g, a seventh further example ("example 6 of determining bit shift values 19, 23, 26 (FIG. 10) is shown in which the layers split into two branches after layer 1 and join at layer 6 (i.e. 1→2→3→6 and 1→3→4→6) and in which there is a change in the value of UV before the branch resulting from an underflow. The OCFP is set to be 15, 14, 13, 12, 13, 12 and 11 for layers 0 to 6 respectively. As shown in FIG. 15g, there is a change in value of UV to −1 in layer 1 and the value of new OCFP is increased by 1 for layer 1 and in each subsequent layer, thereby resulting in values of 15, 15, 14, 13, 14, 13 and 12 for layers 0 to 6 respectively. Accordingly, SFTM and SFTC are decreased by one from 16 to 15 in layer 1 and values of SFTB are increased by one in layers 2 to 6, thereby resulting in values of 15, 15, 14, 15, 14 and 13 for layers 1 to 6 respectively.

Referring to FIG. 15h, an eighth further example ("example 7") of determining bit shift values 19, 23, 26 (FIG. 10) is shown in which the layers split into two branches after layer 1 and join at layer 6 (i.e. 1→2→3→6 and 1→3→4→6) and in which there is a change in the value of UV in first of the two branches resulting from an overflow. The OCFP is set to be 15, 14, 13, 12, 13, 12 and 11 for layers 0 to 6 respectively. As shown in FIG. 15h, there is a change in value of UV to 1 in layer 2 and the value of new OCFP is decreased by 1 for layer 2, layer 3 (i.e. the subsequent layer in the branch) and layer 6 (i.e. a subsequent layer after the branches re-join), thereby resulting in values of 15, 14, 12, 11, 13, 12 and 10 for layers 0 to 6 respectively. Accordingly, SFTM and SFTC are increased by one from 16 to 17 in layer 1 and values of SFTB are decreased by one in layers 2 and 6, thereby resulting in values of 15, 13, 12, 14, 13 and 11 for layers 1 to 6 respectively.

Referring to FIG. 15i, a ninth further example ("example 8") of determining bit shift values 19, 23, 26 (FIG. 10) is shown in which the layers split into two branches after layer 1 and join at layer 6 (i.e. 1→2→3→6 and 1→3→4→6) and in which there is a change in the value of UV in the second of the two branches resulting from an underflow.

Referring to FIG. 15j, a tenth further example ("example 9") of determining bit shift values 19, 23, 26 (FIG. 10) is shown in which the result of layer 1 merges with result of layer 3 (i.e. 1→2→3→4→5→6 and 1→4) and in which there is no change in the value of UV. The OCFP is set to be 15, 14, 13, 12, 11, 10 and 9 for layers 0 to 6 respectively. As shown in FIG. 15j there is no change in UV and so each value of new OCFP is the same as the corresponding (old) value of OCFP. Accordingly, there is no change in SFTM, SFFB and SFTC. The values of SFTM and SFTC are equal to 16 for layers 1 to 6 and the values of SFFB are 15, 14, 13, 12, 11 and 10 for layers 1 to 6 respectively.

Referring to FIG. 15k, an eleventh further example ("example 10") of determining bit shift values 19, 23, 26 (FIG. 10) is shown in which the result of layer 1 merges with result of layer 3 (i.e. 1→2→3→4→5→6 and 1→4) and in which there is a change in the value of UV before the branch arising from an overflow. The OCFP is set to be 15, 14, 13, 12, 11, 10 and 9 for layers 0 to 6 respectively. As shown in FIG. 15k, there is an increase in UV from 0 to 1 in layer 1 and the value of new OCFP is decreased by 1 for layer 1 and in each subsequent layer. Accordingly, SFTM and SFTC are increased by one from 16 to 17 in layer 1 and values of SFTB are decreased by one in layers 2 and 6, thereby resulting in values of 15, 13, 12, 14, 13 and 11 for layers 1 to 6 respectively. The input shift up for channels 2 and 3 are decreased by 2 in layer 4.

Referring to FIG. 15l, a twelfth further example ("example 11") is shown in which the result of layer 1 merges with result of layer 3 (i.e. 1→2→3→4→5→6 and 1→4) and in which there is a change in the value of UV before the branch arising from an underflow. The OCFP is set to be 15, 14, 13, 12, 11, 10 and 9 for layers 0 to 6 respectively. As shown in FIG. 15l, there is a decrease in UV from 0 to −1 in layer 1 and the value of new OCFP is increased by 1 for layer 1 and in each subsequent layer. Accordingly, SFTM and SFTC are decreased by one from 16 to 15 in layer 1 and values of SFTB are increased by one in layers 2 and 6, thereby resulting in values of 15, 15, 14, 13, 12 and 11 for layers 1 to 6 respectively. The input shift up for channels 2 and 3 are decreased by 2 in layer 4.

Referring to FIG. 15m, a thirteenth further example ("example 12") of determining bit shift values 19, 23, 26 (FIG. 10) is shown in which the result of layer 1 merges with result of layer 3 (i.e. 1→2→3→4→5→6 and 1→4) and in which there is a change in the value of UV after the branch arising from an overflow. The OCFP is set to be 15, 14, 13, 12, 11, 10 and 9 for layers 0 to 6 respectively. As shown in FIG. 15m, there is a increase in UV from 0 to 1 in layer 2 and the value of new OCFP is decreased by 1 for layer 2 and in each subsequent layer. Accordingly, SFTM and SFTC are increased by one from 16 to 17 in layer 2 and values of SFTB are decreased by one in layers 2, thereby resulting in values of 15, 14, 12, 11, 10 and 9 for layers 1 to 6 respectively. The input shift up for channels 2 and 3 are decreased by 2 in layer 4.

Referring to FIG. 15n, a fourteenth further example ("example 13") of determining bit shift values 19, 23, 26 (FIG. 10) is shown in which the result of layer 1 merges with result of layer 3 (i.e. 1→2→3→4→5→6 and 1→4) and in which there is a change in the value of UV after the branch arising from an underflow. The OCFP is set to be 15, 14, 13, 12, 11, 10 and 9 for layers 0 to 6 respectively. As shown in FIG. 15n, there is a decrease in UV from 0 to −1 in layer 2 and the value of new OCFP is increased by 1 for layer 2 and in each subsequent layer. Accordingly, SFTM and SFTC are decreased by one from 16 to 15 in layer 2 and values of SFTB are increased by one in layers 2 and 6, thereby resulting in values of 15, 14, 14, 13, 12 and 11 for layers 1 to 6 respectively. The input shift up for channels 2 and 3 are decreased by 2 in layer 4.

Hardware CNN Module Implementation

Figure 16:
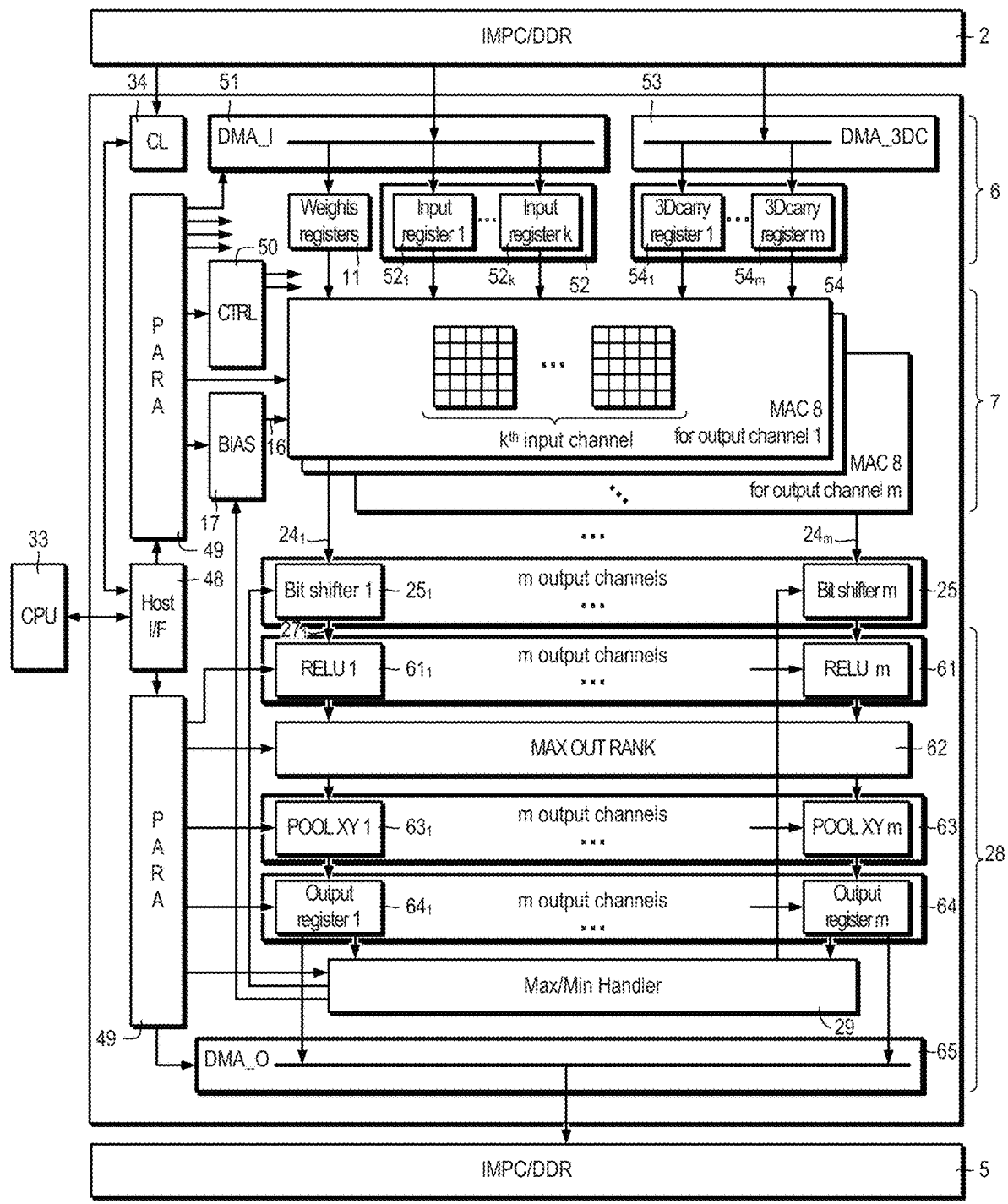
FIG. 16 illustrates implementation of the CNN hardware module shown in FIG. 10 which includes a MAC array module comprising m MACs, one for each of m output channels.

Referring to FIG. 16, the CNN module 1 is shown in more detail.

The CNN module 1 includes the command issue unit 34 (herein referred to as "CL") which processes the command list 35 (FIG. 14), a host interface 48 for accessing registers in the CNN module 1 and which can be accessed by the host CPU 33 and by the CL 34, parameter registers 49 for holding data for configuring the CNN module 1 and a control unit 50 which controls reset, clock enable, trigger start and stop, and other similar forms of processing.

DMA Input Data Module 51 (or "DMAI")

The CNN module 1 includes a first direct memory access (DMA) input module 51 which is responsible for transferring data from IMPC/DDR 2 to input buffers (not shown) in input registers $52_1, \ldots, 52_k$ in input register module 52.

The first DMA input module 51 supports row-wise synchronization between data processing process and data pre-loading. In this case, the first DMA input module 51 supports data transfer to seven input buffers (not shown) in each input register $52_1, \ldots, 52_k$. The module 51 supports initial data load of up to 5 rows. It can support data transfer of multiple rows in the background while data processing is taking place and data transfer of multiple rows in the foreground while data processing is waiting to occur.

As mentioned earlier, the first DMA input module 51 can support up to 4 channels. Additional DMA input modules (together with suitable arbitration logic) may be provided. For example, four DMA input modules may be used, one module for each channel and a set of four enable bits (not shown) may be used to selectively enable each channel.

On the IMPC/DDR side, the first DMA input module 51 provides pixel-aligned access. On the input buffer side, the DMA input module 51 writes data to an input buffer (not shown) from left to right, i.e. data is left-aligned.

The first DMA input module 51 can support pixel-wise striding in the IMPC/DDR 2 for each channel. The module 51 can support magnification in a horizontal direction (or "row") for each channel. For example, a 1-bit R field may be used to indicate repeat or skip, for example, using R=1 and R=0 respectively), and a 3-bit number field, n, to indicate the number of bits in the row to miss out. For example, for R=1 and n=2, if a row includes input pixels values 11, 12, 13, 14, 15, 16, 17, 18, 19, the output is 11, 14 and 17. The DMA input module 51 can support magnification in a vertical direction (or "column") for each channel. The DMA input module 51 preferably supports format conversion on request, such as conversion of unsigned 8-bit numbers to signed 16-bit numbers and/or signed 8-bit numbers to signed 16-bit numbers.

The first DMA input module 51 can handle data with x length of up to 128 pixels and y length of up to 4095 for up to 4 channels.

DMA Carry Data Module 53 (or "DMA3DC")

The CNN module 1 includes a second DMA input module 53 which is responsible for transferring data from IMPC/DDR 2 to input buffers (not shown) in carry registers $54_1, \ldots, 54_m$ in carry register module 54.

The second DMA input module 53 preferably supports double buffering wherein first and second buffers (not shown) are used and wherein one buffer is used to preload data and the other is used for processing data.

The second DMA input module 53 supports row-wise synchronization between data processing and data re-loading. Initially, data can be loaded in a row. Data can be transferred to one buffer (not shown) in the background while data in the other buffer is processed. It can support data transfer of multiple rows in background to the data process and data transfer of multiple rows in foreground while data process is waiting.

The second DMA input module 53 can support up to 8 channels. Additional DMA input modules (together with suitable arbitration logic) may be provided. For example, 8 DMA input modules may be used, one module for each channel and a set of eight enable bits (not shown) may be used to selectively enable each channel.

On the IMPC/DDR side, the DMA input module 53 provides pixel-aligned access. On the input buffer side, the DMA input module 53 writes data to a carry input buffer (not shown) from left to right, i.e. data is left-aligned.

The second DMA input module 53 can support pixel-wise striding in the IMPC/DDR 2 for each channel in the same way as the first DMA input module.

The second DMA input module 53 can handle data with x length of up to 128 pixels and y length of up to 4095 for up to 8 channels.

Weights Value Register 11 (or "WEIGHT_REG")

Referring again to FIG. 16, the CNN module 1 comprises a weights value register module 11 comprises first and second input buffers (or "register files") (not shown) for storing weights in k.m. 5×5 rows of 16-bit words. The weights register module 11 stores weight values received via the control line and delivers the weight values for convolutional neural network processing to the MAC array 7. The weights register module 11 supports double buffering and so the module 11 may store values and deliver values to the MAC array 7 in parallel. While one buffer (not shown) is used for the CNN processing of a set of channels, the other buffer (not shown) is filled in the background over control line with weight values for the next set of channels.

To fill the weight buffers, the buffer elements (not shown) are mapped into the register file address space from address 0x5000 to address 0x5FFC. Additionally, a command (not shown) is added the CNN command list 35 (FIG. 10) for clearing all entries of a buffer. A 2-bit parameter N for the command, may specify for N=0 that neither buffer 0 or buffer 1 are cleared, for N=1 that buffer 0 is cleared, for N=2 that buffer 1 is cleared and for N=3 that both buffer 0 and buffer 1 are cleared.

Referring to FIG. 19a, smaller convolution matrices (i.e. smaller than a 5×5 matrix) may be specified by filling unused elements of the matrix by zeros.

Referring to FIG. 19b, padding may be added according to the selected matrix positioning.

Input Register Module 52 (or "IN_REG")

The CNN module 1 includes input register module 52 which comprises 7 input buffers (or "register files") (not shown) for storing data in rows of 128 pixels (i.e. as 16-bit words). The input data from seven rows is stored in these 7 register files (not shown).

During processing of a 5×5 kernel, five register files (not shown) can be assigned to a MAC array module 7 so as to feed the input from five rows to the MAC array module 7. The last two register files (not shown) are assigned to the first DMA input module 51 so as to allow preloading of data for the following rows from the first DMA input module 51 up to a vertical stride factor of 2 in parallel with execution in the MAC array module 7 new data. The bandwidth to the MAC array 7 is five pixels for each register file (not shown), while the bandwidth to first DMA input module 51 is 16 pixels. The rows rotate, which means that the rows which have are unassigned to the first DMA input module 51 for the longest time are the next to be assigned, while five rows are assigned to the MAC array module 7. On the output side to the MAC array 7, data is read and prepared for the MAC array 7.

Figure 20A:
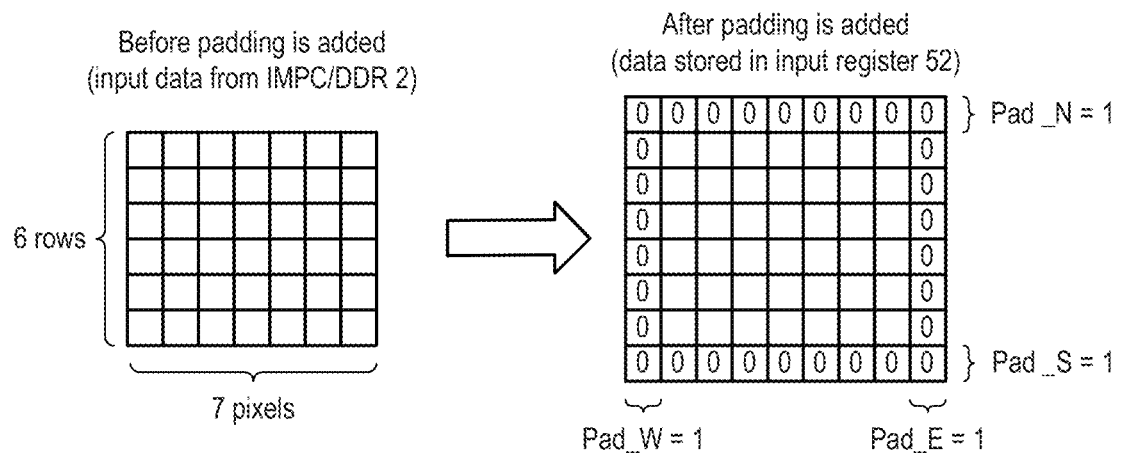
FIG. 20a illustrates a first example of adding padding data to input data.
Figure 20B:
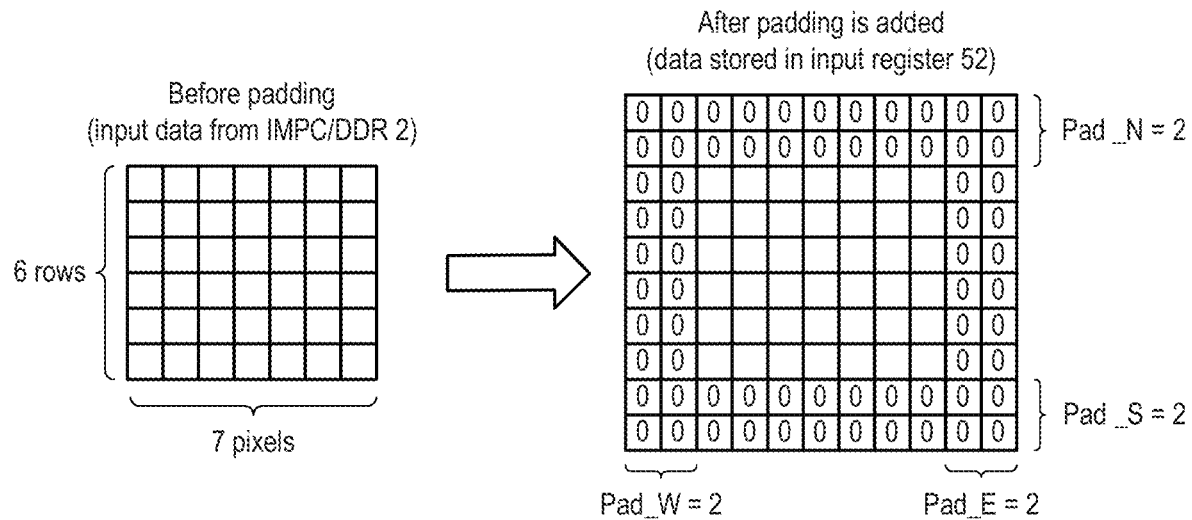
FIG. 20b illustrates a second example of adding padding data to input data.
Figure 21:
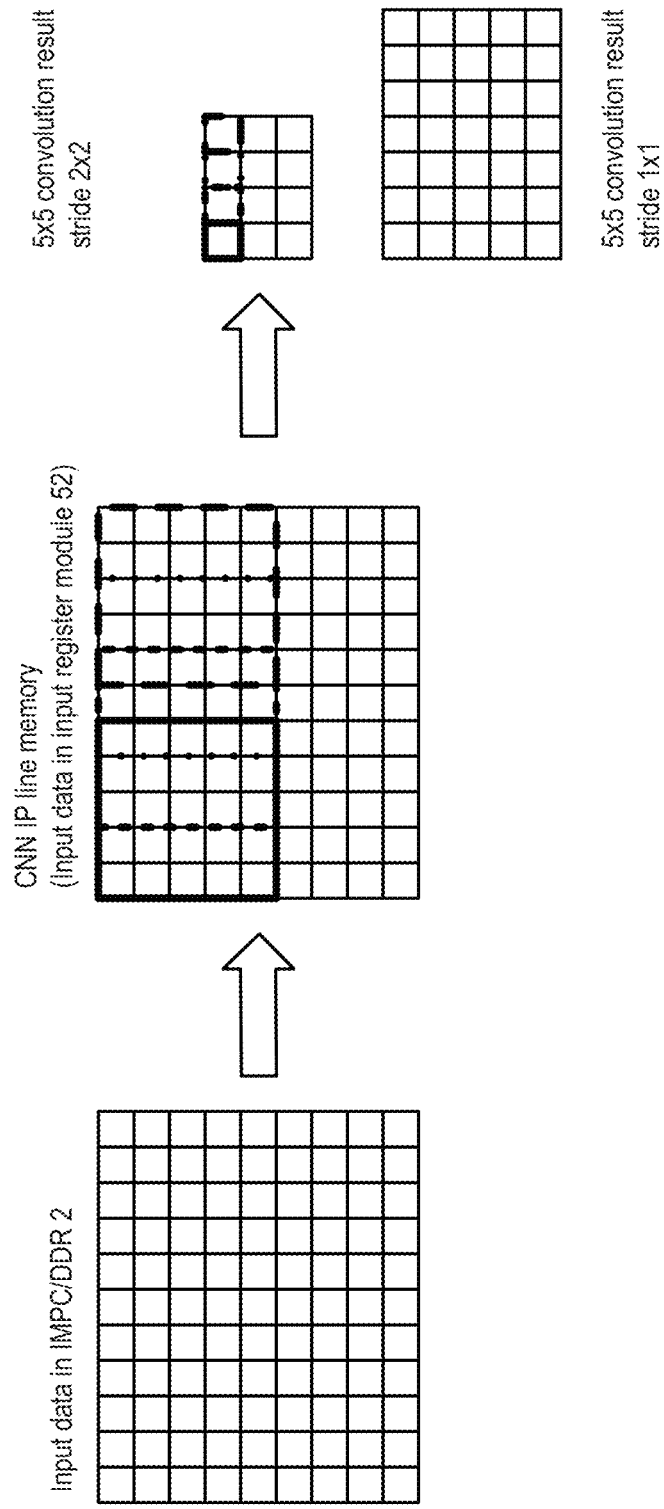
FIG. 21 illustrates an example of striding.

Referring also to FIGS. 20a and 20b, the input register module 55 can perform padding by adding pixels having a value 0. The amount of padding to add to each side of the input data can be independently set, for example, by specifying values pad_N, pad_E, pad_S, and pad_W. FIG. 20a shows an example of a tile of input data in the form of six rows of seven pixels to which one pixel of padding is added on each side, i.e. pad_N=pad_E=pad_S=pad_W=1. FIG. 20b shows another example of a tile of input data to which two pixels of padding are added, i.e. pad_N=pad_E=pad_S=pad_W=2.

Referring again to FIG. 16, a write control process (WRITE_CTRL process) (not shown) handles data write transfer to one or two of the seven register files (not shown) in an input register $52_1, \ldots, 52_k$. The write control process specifies which register file (not shown) to use. The DMA input module 51 specifies when and which of the 256 bits to write and at which address.

A read control process (READ_CTRL process) (not shown) handles data read from a register files (not shown) in an input register $52_1, \ldots, 52_k$. Five read control processes are available for data read from the five register files (not shown) which are not being used by the write process. Each read control process is responsible for reading 1 pixel from each of the 5 register files.

An overall control process (CTRL process) (not shown) handles control of the input register module 52. It controls data positioning and zero insertion based on the CNN striding and padding settings. Magnitude settings do not have any influence on this module 52 because the magnitude settings are handled in the DMA modules.

As mentioned earlier, padding involves adding a specified number of zeros at the output of the 5×5 value array which is given in each clock cycle to the MAC array 7. Padding is used, for example, to implement smaller kernel sizes on a 5×5 MAC array 7. For the case of a non-symmetric arrangement of the kernel, if a 3×3 kernel is used, a padding of 2 values is needed on lower and right sides and, if a 1×1 kernel is used, a padding of 4 values is needed on lower and right side.

In addition to using padding for smaller kernel sizes, padding of the output size can be increased. This can be useful to support pooling of sizes which are not a natural multiple of the tile size. The padding amount is specified by four input parameters.

In CNN striding, stepping between the data sets between 2 consecutive convolutions can be defined. In contrast to magnitude setting (where pixels are skipped for start position determination and for the convolution process), pixels here are only skipped for start position determination. For the convolution process, all pixels are used. Because of the limited number of input register rows, CNN striding in vertical direction results in lower efficiency for a striding factor larger 2 because rows necessary for the following processing step cannot be preloaded in parallel to the current CNN processing step of 1 row. When specifying a horizontal stride larger than 1, a number of values are skipped inside the register file (not shown) when calculating the start position. This differs from a reduction setting for the horizontal magnitude because the reduction handling is already considered during filling up the register file (not shown). The horizontal positions from where the data is read are the consecutive addresses in the register file.

A register process (REG process) (not shown) holds all registers of the input register module 52 required to store temporary used values, such as internal state, values needed for padding or CNN striding functions.

In addition to padding and striding, when reading out data values for the MAC array module 7, an input data shift can be executed in this module which supports shifting of $-15 \leq \text{shift value} \leq 15$ for each input channel.

The read process comprises the following steps. A 5×5 array for the MAC array for each input-output channel combination is prepared. The upper left position and lower right position for a 5×5 pixel area taking padding values into account is specified. If kernel size is decreased, then padding is added. Boundary padding may be added. Outside the tile area, values are set to 0 and insider the tile area, values are filled with data from the input buffers (not shown). The upper left value position inside input buffers (not shown) by taking striding in x and y direction into account is specified. The shift value shift value for each input channel is taken into account.

Carry Register Module 54 (or "3DCARRY_REG")

The CNN module 1 includes carry register module 54 (or "3DCARRY_REG module") which is responsible for taking carry data sent by the second DMA data module 53 and sending the data to the MAC array module 8 as carry input data. The carry register module 54 supports double buffering, namely while one 128×16-bit register file (not shown) is assigned to the input data path (not shown) from the second DMA module 53, another 128×16-bit register file (not shown) is assigned to the output data path to the MAC array module 8. After each round, i.e. processing of 1 row, register file assignment switches so that data loaded in the previous round over DMA during data preloading is sent to the MAC array in the current round for processing. This enables the parallel execution of data preloading and data processing. Assignment switches after receiving a new row start signal.

Further to format conversion and magnification, which are both supported by the second DMA data module 53, the carry register module 56 can execute a carry data shift which supports shifting of $-15 \leq \text{shift value} \leq 31$ for each carry data channel.

MAC Array Module 7 (or "MAC_ARRAY")

Figure 17:
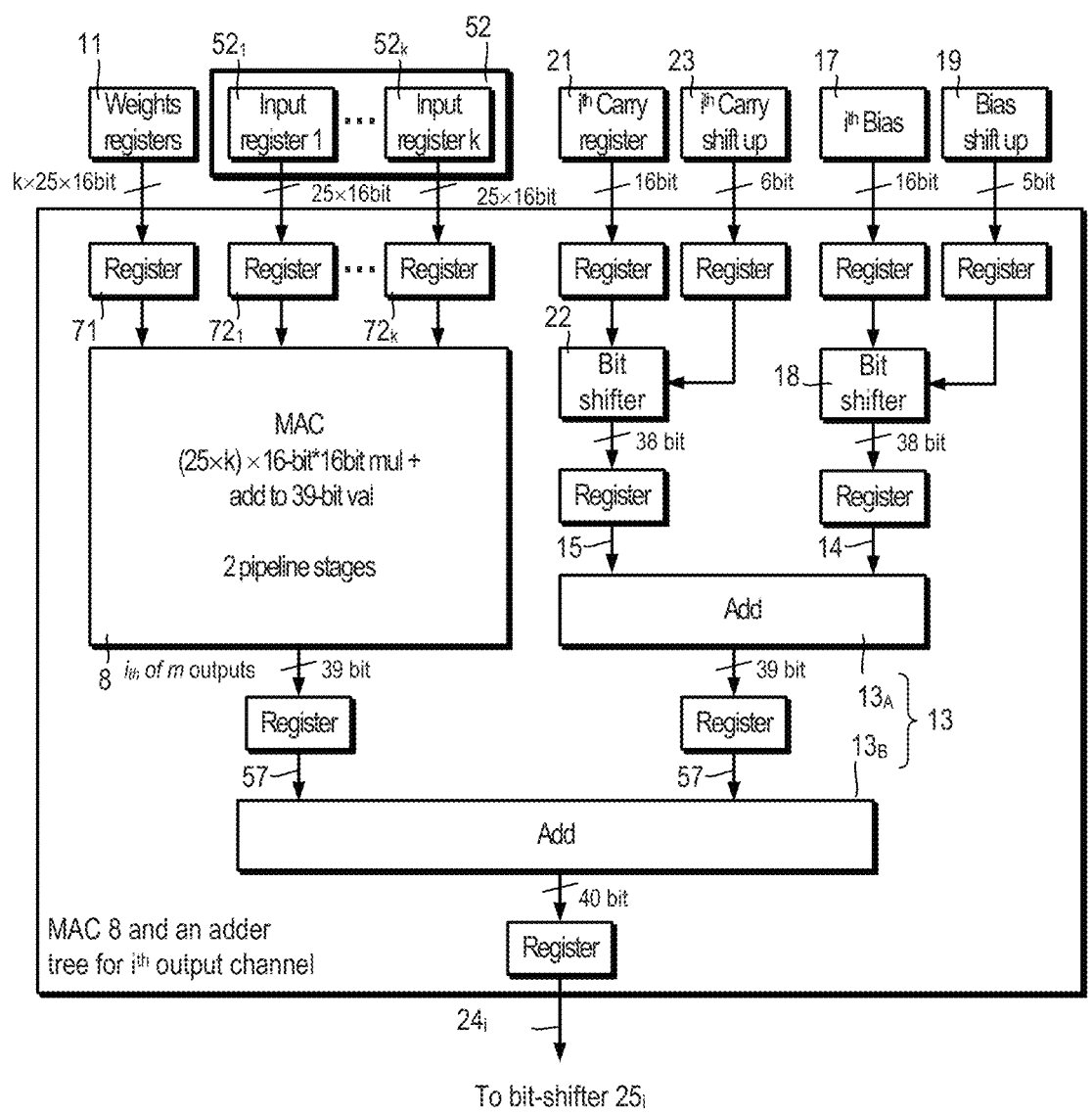
FIG. 17 is a schematic block diagram of a MAC and an adder tree for one of the m output channel.
Figure 18:
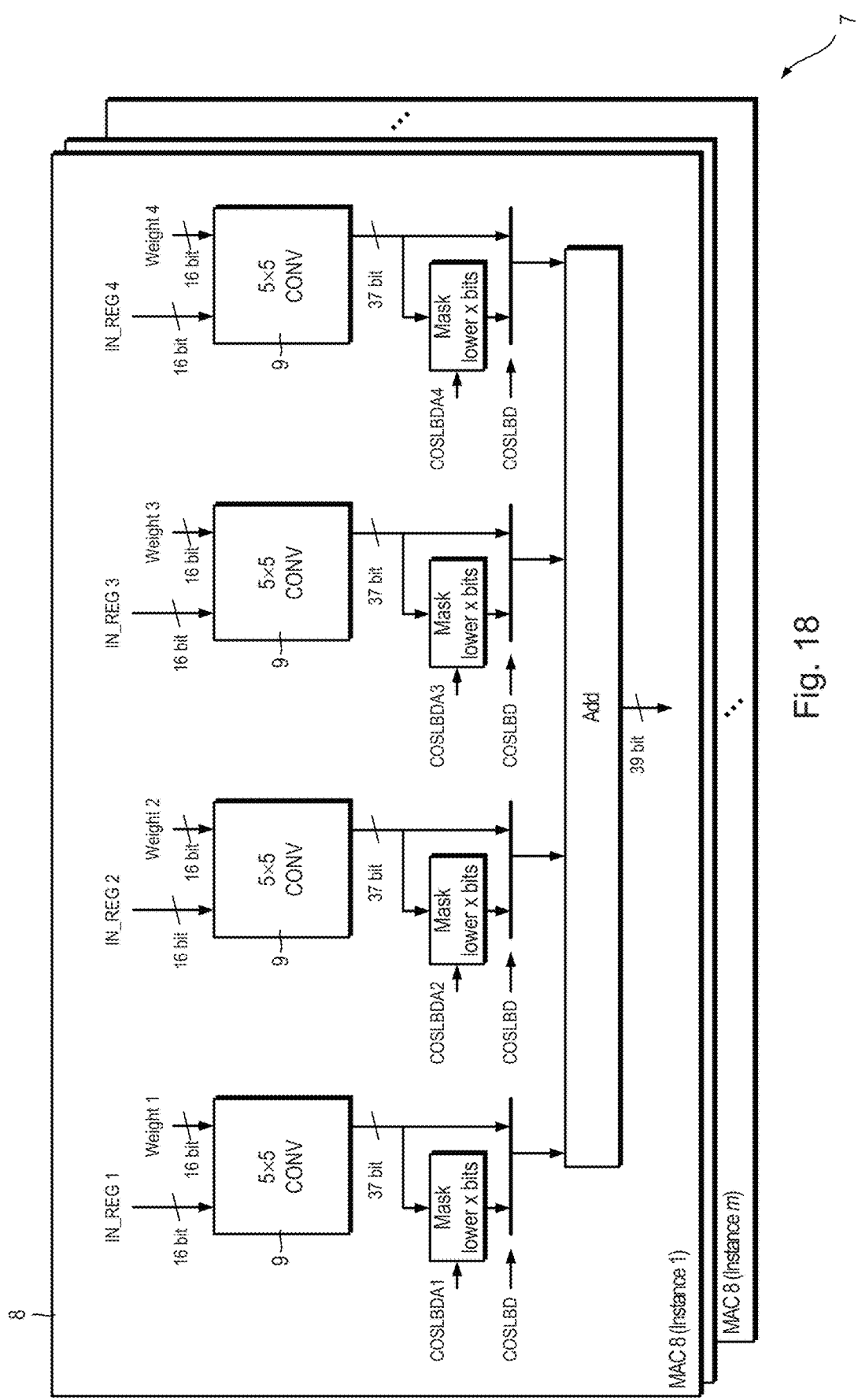
FIG. 18 is a schematic block diagram of a MAC module shown in FIG. 16.

Referring still to FIG. 16 and to FIGS. 17 and 18, the MAC array module 7 (referred to simply as the "MAC array") is responsible for performing multiply and addition on all given input sources. Thus, 4×25 16-bit signed input values from the input register module 52 are multiplied with 4×25 16-bit signed input values from the weight register module 11 resulting in an output 57. In the MAC array 7, there are m-instances of MACs 8, i.e. m MACs 8. In this case, m=8.

FIG. 17 shows how a MAC 8 and a corresponding adder tree outputs a result for one channel.

Referring to FIG. 17, there are m carry registers 21, m carry shift up registers 23, m bias registers 17 and preferably one bias shift up register 19. There are m carry shift registers 23 to cover complicated CNN networks. However, for typical CNN networks, the m carry shift registers 23 hold the same value. There is preferably only one bias shift up register 19 (and the same value is used for each output channel) since the number output format is the same for all m output channels.

The bit-shifted bias signal 14 and the bit-shifted carry signal 15 are added, in a first adder 13A, resulting in a first sum 57 which is added, in a second adder 13$_B$, to the output 58 of the MAC 8, resulting in second sum 24 (also referred to as the "result" or "output" of the MAC 8). The result 24 is provided to the saturation bit-shifter module 25. For each enabled output channel, this module is active for each clock cycle where an input enable signal (not shown) is set.

FIG. 18 shows a MAC array 7 comprising m MACs 8.

Referring in particular to FIG. 18, the MAC 8 is responsible for performing the 5*5 convolution for 4 input channels. In addition, to support the Caffe deep learning framework, it is possible to mask the lower x bits of the 37-bit convolution output. Therefore, for each output, the number of lower bits to mask can be specified. The masking is either done or not done for all input-output channel combinations. After, the selected output values (masked or unmasked) are added to form the 39-bit output vector of the MAC 8.

Bias Value Register Module 17 (or "BIAS_REG")

Referring again to FIG. 16, the CNN module 1 includes a bias value register module 17 comprising m registers (not shown). The bias value register module 17 is responsible for storing and distributing bias values $16_1, \ldots 16_m$. During initialization, the bias values $16_1, \ldots 16_m$ for the m output layers are loaded into the bias registers. During execution, the bias values $16_1, \ldots 16_m$ are sent with a multiplication factor representing the bias shift up to the MAC array 7.

Saturation Bit-Shifter Module 25 (or "SGIFT_SAT")

Referring still to FIG. 16, the saturation bit-shifter module 25 is responsible for shifting output 24 of each MAC 8 by the number of bits specified by SFTM 26, which has been prior loaded over control line. The shifted value 27 is saturated to prevent an overflow. Saturation to unsigned 8-bit number, signed 8-bit number or signed 16-bit number may be used. The format is chosen according to the output pixel format in the DMA output data module.

Rectified Linear Unit Module 61 (or "BRELU")

Referring still to FIG. 16, a Rectified Linear Unit (RELU) module 61 is responsible for performing an activation function f(x)=MIN(BRELUVAL,MAX (o, x)) (or "bounded RELU"). All input values smaller than zero are set to zero, all values larger than BRELUVAL are set to BRELUVAL and values between 0 and BRELUVAL pass unchanged.

Ranking Module 62 (or "MAX_OUT_RANK")

Referring again to FIG. 16, the CNN module 1 includes a ranking module 62 (herein also referred to as a "MAX_OUT_RANK module 62") which can perform one or both of two operations according to whether a selection bit (RANKSEL) (not shown) is set. If the RANKSEL (not shown) is set, a ranking operation is executed. Otherwise, a maximum readout operation is performed.

Figure 22A:
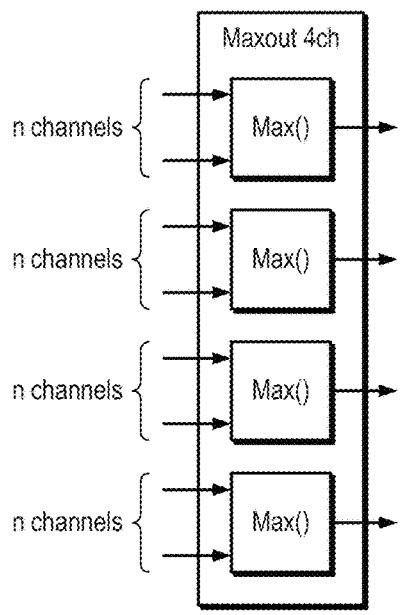
FIGS. 22a, 22b and 22c illustrate four-channel pooling, two-channel pooling and one-channel pooling.
Figure 22B:
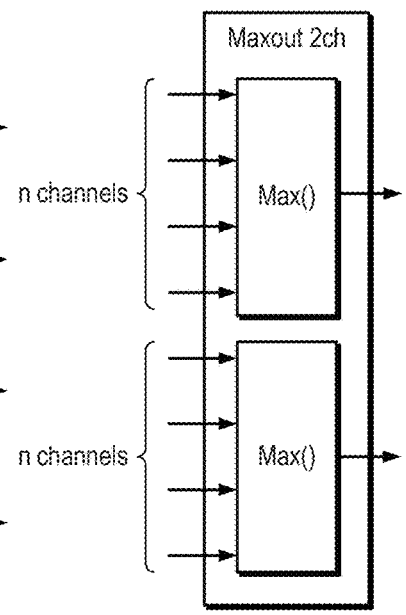
Figure 22C:
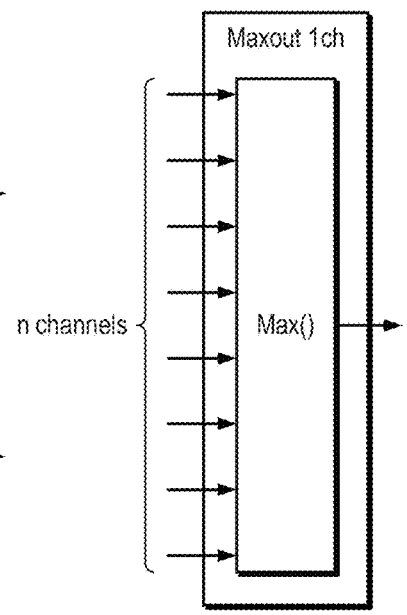

Referring also to FIGS. 22a to 22c, in a maximum readout operation, the maximum value from n values taken from n neighboring channels is chosen. The value n is given in a coded form by a vector (MAXORANKVAL) (not shown) and the number of output channels is an integer number of n neighboring channels. Thus, the selection process can be done in one run at the same clock cycle. n may be 1, 2, Half Output Channel (HOC) and Output Channel (OC) are supported. Depending on the value of n defined (over CL), the number of enabled processing channels m is changed to a value x for the following modules starting with the down sampling module 63.

Figure 23:
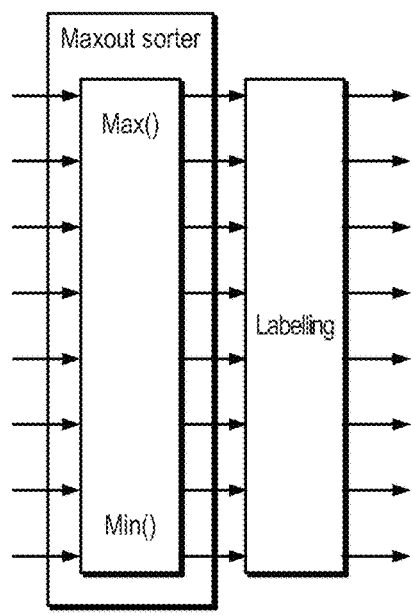
FIG. 23 illustrates pixel labelling.

Referring also to FIG. 23, in a ranking operation, first m input channels are ranked and then the lower 5 data bits of each channel are replaced with a 3-bit fixed input channel label (for bits 0 to 2) and, if selected, a 2-bit custom label (for bits 3 and 4).

Down Sampling Module 63 (or "POOL_XY")

Referring again to FIG. 16, the CNN module 1 includes a down sampling module 63 (herein referred to as a "POOL_XY module").

Figure 24:
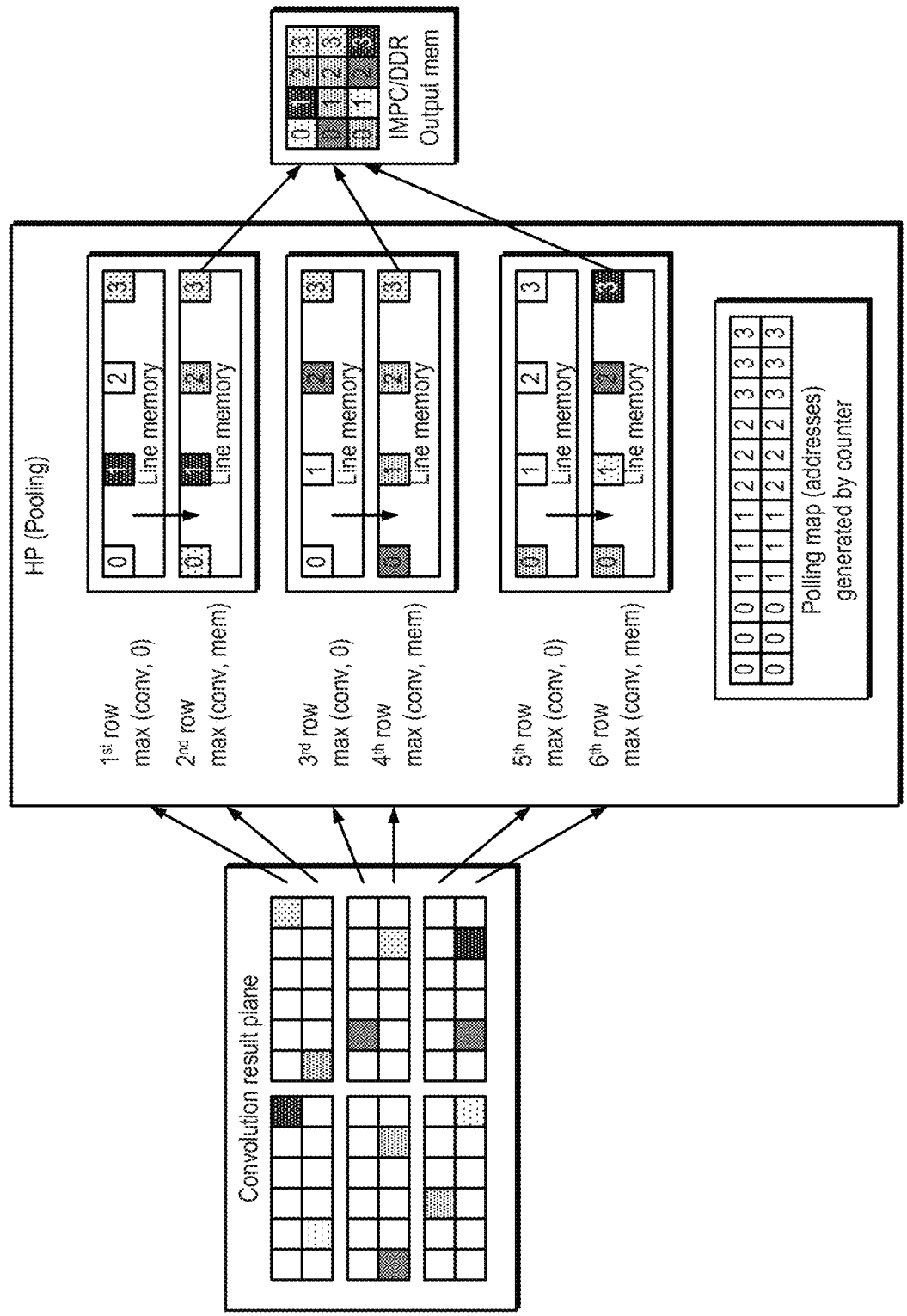
FIG. 24 illustrates x/y pooling.

Referring also to FIG. 24, the down sampling module 63 selects one of two input values according to definable test, in this case, which one of the two input values is larger. One input value comes from the down sampling module 63 and the other input value comes from the output register 64. The larger value is stored in the output register 64.

Output Register Module 64 (or "OUT_REG")

Referring again to FIG. 16, the CNN module 1 includes an output register module 64 which comprises two input buffers (or "register files") (not shown) for storing data in rows of 128 pixels (i.e. as 16-bit words).

The output register module 64 supports double buffering while one of the two 128×16-bit buffers (not shown) is assigned to an output data path to the DMA output module 65, the other one is assigned to an input data path from the down sampling module 63. After each cycle (i.e. the processing of one row), the assignment switches and so data processed in the previous cycle is transmitted via the DMA output module 65 to the IMPC/DDR. This enables parallel execution of data transfer and data processing.

The output register module 64 is responsible for four tasks. First, the module 64 receives the output from the down sampling module 63 and stores the value inside buffer elements (not shown) at an address stored inside local registers (not shown). The address is set to 0 at the beginning of a row process and, if the module 63 is enabled, is incremented depending on the pooling setting in x direction. Second, it specifies comparison data for the down sampling module 63. This is done dependent on the output channel enable bit (not shown) and pooling settings (not shown) in x and y direction. Thirdly, in response to a request from the DMA output module 65, it reads out data that has been requested by the DMA output module 65 for transfer to the IMPC/DDR 5. Fourthly, in boundary checking, the output register module 64 checks whether the final value after the MAX_OUT_RANK operation, the POOL_XY operation and absolute value generation exceeds a set upper boundary or below a set lower boundary. If the final value falls outside the range, then the output register module 64 signals this to the level handler 30 using first or second signals ("MAX_EXCEED" and "MIN_EXCEED").

For the required data to the down sampling module 62, data from the correct buffer address is read. Therefore, pooling parameters in horizontal and vertical direction are checked. These parameters should divide the specified tile width and tile height wholly (i.e. without remainder). If they do not, padding is added in horizontal and/or vertical direction so that the parameters do divide the tile width and height wholly.

Saturation/Depletion Handler 30 (or "MAX_MIN_HANDLER")

Referring again to FIGS. 10, 11 and 16, the saturation/depletion handler module 30 is responsible for detecting whether an unacceptable proportion of output values for all channels for a layer lie outside a user-defined range. If so, a flag, i.e. UV, is set signaling that correction of the output channel fractional position used for the shift values 19, 23 and 25 for bias value 16, carry value 22 and MAC output 24 is required starting with this layer from the next picture. Additionally, a mask-able interrupt 33 is set for CPU notification without interrupting the CNN process and the counter value MAXSUM_CNT and MINSUM_CNT are saved for analysis. As long as the CPU clear the interrupt setting, no further notification or counter saving is done.

Outputs 29 signaling that an output value has fallen below the minimum threshold or has exceeded a maximum ("MIN_EXCEED" and "MAX_EXCEED") from the output register module 64 for the m output channels are used. These 1-bit signals are added up in a MIN_CNT value (not shown) and MAX_CNT value (not shown) for each channel. At the end of a processing a layer, the individual counters for each channel are added to MINSUM_CNT and MAXSUM_CNT counters before their values are reset.

The MINSUM_CNT and MAXSUM_CNT counters are compared against MAXSUM_CNT_THRES and MINSUM_CNT_THRES threshold values, namely:

```
If (MAXSUM_CNT > MAXSUM_ CNT_THRES)
    OVERFLOW
ELSE IF (MINSUM_CNT >= MINSUM_CNT_THRES)
ELSE
    UNDERFLOW
```

In the case of OVERFLOW or UNDERFLOW, the maskable interrupt for CPU is set.

Additionally, a temporary update value TUV is calculated and is transferred to the update value table 31. Further, the MAXSUM_CNT and MINSUM_CNT values are copied into debug registers (not shown) and the CPU 33 is informed by setting the interrupt signal.

After a picture has been processed, an update of the output channel fractional position is requested. For each layer, three values can be used, namely −1, 0 and 1 for the update value of the update value table.

A value 0 indicates that there is no overflow or underflow and so no change in the output channel fractional position is needed. A value of 1 indicates that an overflow has occurred and so a reduction in the output channel fractional position by one is required. A value of −1 indicates that an underflow has happened and so the output channel fractional position by one should be carried out.

In hardware, only the first layer with an update value unequal 0 is considered. If the user needs more layers to be considered, the update of the output channel fractional position table is performed by the CPU 33.

Following update of the output channel fractional position, the following picture is then processed using new values of bias input shift 19, carry input shift 23 and MAC output shift 26 for all channels.

For an update value of 1, the output channel fractional position for a layer is reduced by 1 position which is achieved by increasing the shift of the MAC output and the shift of the carry input for the layer by 1, while the shift of the bias value is decreased by one for the following layers. For an update value of −1, the output channel fractional position for a layer is increased by 1 position which is achieved by decreasing the shift of the MAC output and the shift of the carry input for the layer by 1, while the shift of the bias value is increased by one position for the following layers.

DMA Output Module 65 (or "DMAO")

The CNN module 1 includes a DMA output module 65 which is responsible for transferring data from output buffers (not shown) in the output registers $65_1, \ldots, 65_m$ to the IMPC/DDR 5.

Preferably, the DMA output module 65 supports double buffering wherein first and second buffers (not shown) are used and wherein one buffer is used to preload data and the other is used for storing data.

The DMA output module 65 supports row-wise synchronization between processing data process and storing data. It can support final data store of one row of data, while transferring 1 row of data in the background.

The DMA output module 65 can support up to 8 channels. Additional DMA input modules (together with suitable arbitration logic) may be provided. For example, 8 DMA output modules may be used, one module for each channel. A set of eight enable bits (not shown) may be used to selectively enable each channel.

The DMA output module 65 preferably supports format conversion on request, such as conversion of signed 16-bit numbers to signed 8-bit numbers and/or signed 16-bit numbers to unsigned 8-bit numbers.

The DMA output module 65 can handle data with x length of up to 128 pixels and y length of up to 4095 for up to 8 channels.

Operation

Referring to FIG. 22 and to FIGS. 25 to 31, a method of operating the CNN module 1 will now be described.

Each time an image (or "picture") is received, the command issue unit 34 executes picture prolog control to prepare the module 1 for a new picture (step S1).

The command issue unit 34 then carries out several steps which are repeated for each channel, for each tile in a channel and for each layer in a tile (steps S2 to S8). In particular, the command issue unit 34 executes layer prolog control for each layer in a picture (step S2), executes channel set prolog control (step S3) and performs channel set processing (step S4) for each channel (step S5) and for each tile (step S6). Once a layer has been processed, the command issue unit 34 executes a layer epilog control (step S7) for each layer (step S8).

Once layer processing has been completed for a picture, the command issue unit 34 performs picture epilog control (step S9) and starts processing the next picture (step S10).

Figure 26:
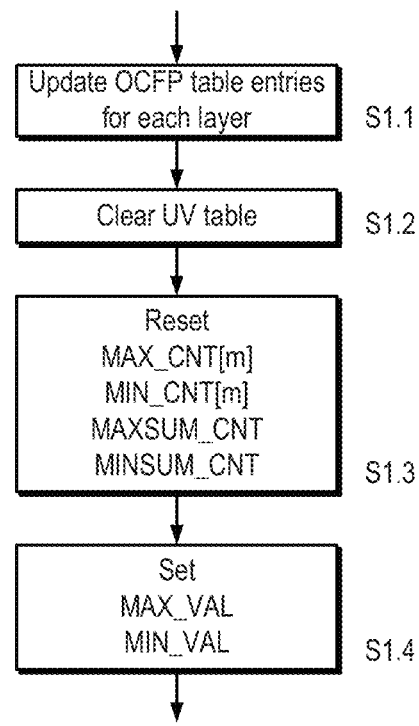
FIG. 26 is a process flow diagram of a method of initializing CNN hardware ready for processing a picture.

Referring in particular to FIGS. 11 and 26, each time the command issue unit 34 initializes the module 1 for a new picture, it updates the entries in the OCFP table 32 (step S1.1), it clears the UV table 31 (step S1.2), resets MAX_CNT and MIN_CNT counters (for all m channels) and MAXSUM_CNT and MINSUM_CNT counters (step S1.3) and sets the MAX_VAL and MIN_VAL thresholds (step S1.4).

Figure 27:
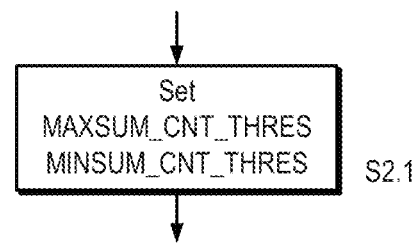
FIG. 27 is a process flow diagram of a method of initializing CNN hardware ready for processing layers.

Referring in particular to FIGS. 11 and 27, each time the command issue unit 34 executes layer prolog control, it sets the MAXSUM_CNT_THRES and MINSUM_CNT_THRES counter thresholds (step S2.1).

Figure 28:
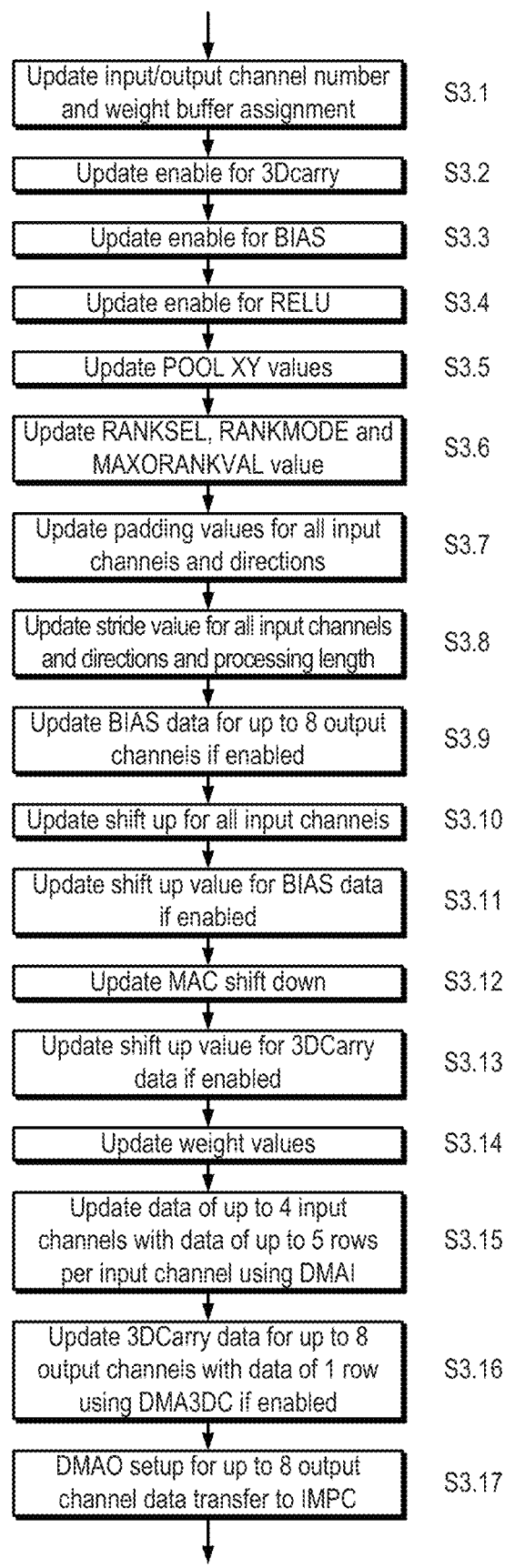
FIG. 28 is a process flow diagram of a method of initializing CNN hardware ready for processing a set of channels.

Referring in particular to FIGS. 16 and 28, during channel set prolog control, the command issue unit 34 causes updating of the input/output channel number and weight buffer assignment (step S3.1), updating of the enable for 3Dcarry (step S3.2), updating of the enable for BIAS (step S3.3), updating of the enable for RELU (step S3.4), updating of the POOL XY values (step S3.5), updating of RANKSEL, RANKMODE and the MAXORANKVAL value (step S3.6), updating of the padding values for all input channels and directions (step S3.7), updating of the stride values for all input channels and directions and processing length (step S3.8), updating of the BIAS data for up to 8 output channels, if enabled (step S3.9), updating of the shift up for all input channels (step S3.10), updating of the shift up value for BIAS data, if enabled (step S3.11), updating of the MAC shift down (step S3.12), updating of the shift up value for 3DCarry data, if enabled (step S3.13), updating weight values (step S3.14), updating of data of up to 4 input channels with data of up to 5 rows per input channel via the DMAI data module 51 (step S3.15), updating 3DCarry data for up to 8 output channels with data of 1 row using DMA3DC data module 53, if enabled (step S3.16), and setting up the DMA output module 65 for up to 8 output channel data transfer to memory 2 (step S3.17).

Figure 29A:
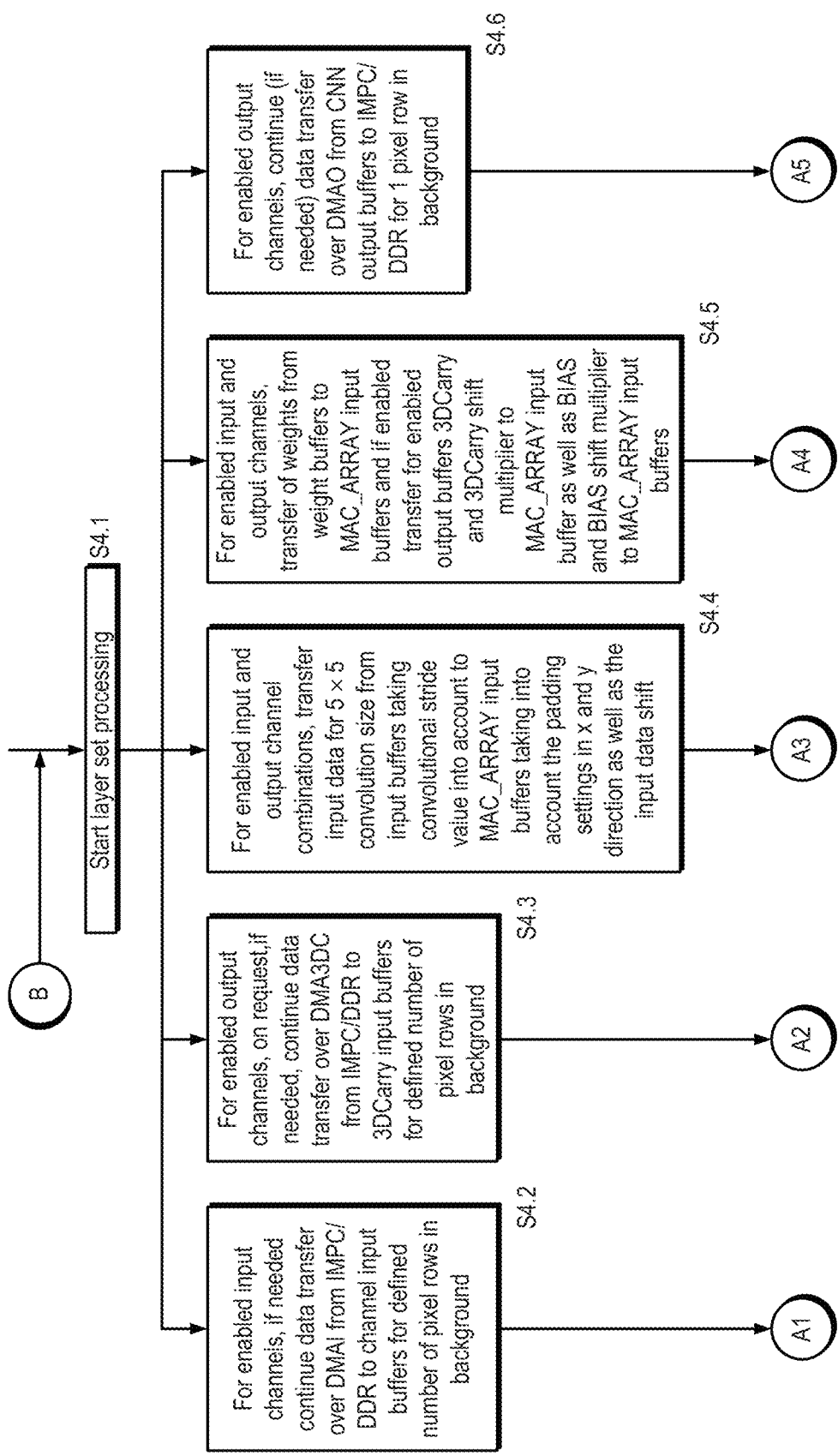
FIGS. 29a and 29b is a process flow diagram of a method of processing a set of channels.
Figure 29B:
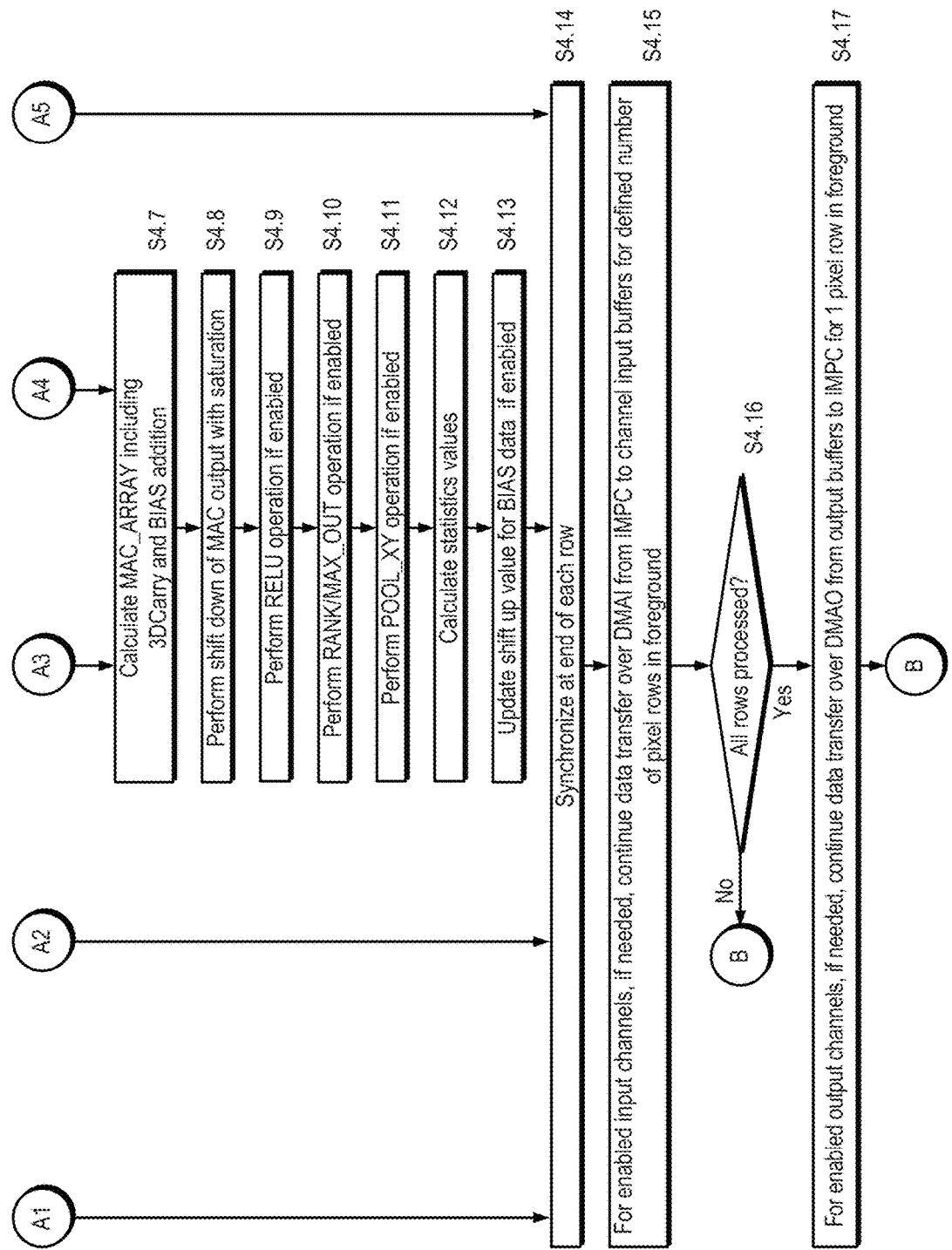

Referring in particular to FIGS. 16 and 29a and 29b, during channel set prolog control, the command issue unit 34 causes layer set processing to start (step S4.1) and several processes to be executed synchronised on a row basis (step S4.2 to S4.13).

For enabled input channels, if needed, data transfer take places in the background from the memory 2, via the DMA input data module 51, to the channel input buffers $52_1, \ldots, 52_k$ for a defined number of pixel rows (step S4.2). Likewise, for enabled output channels, on request, if needed, data transfer takes place in the background from the memory 2 via the DMA3DC data module 53, to the 3DCarry input buffers $54_1, \ldots, 54_m$ for a defined number of pixel rows (step S4.3). For enabled input and output channel combinations, input data for 5×5 convolutions are transferred from the input buffers $52_1, \ldots, 52_k$, taking convolutional stride value into account, into the MAC_ARRAY input buffers $72_1, \ldots, 72_k$ (FIG. 17) taking into account the padding settings in x and y direction, as well as the input data shift (step S4.4). For enabled input and output channels, weights from the weight buffers 11 are transferred to the MAC_ARRAY input buffers and data from any enabled output buffers 3DCarry and 3DCarry shift multiplier, as well as BIAS and BIAS shift multiplier, are transferred to MAC_ARRAY input buffers 71 (FIG. 1) (step S4.5). For enabled output channels, if needed, data transfer takes place in the background via the DMA output module 65 from CNN output buffers $64_1, \ldots, 64_m$ to memory 5 for one pixel row in background (step S4.6).

The MAC_ARRAY 7 performs a calculation including 3DCarry and BIAS addition (step S4.7) and the saturation bit shifter 25 performs a shift down of the MAC output (step S4.8). If enabled, the RELU module 61 performs a RELU operation (step S4.9). If enabled, the ranking module 62 performs a ranking operation (step S4.10). If enabled, the down sampling module 63 performs a down sampling operation (step S4.11). The max/min handler 39 calculates statistics values (step S4.12) and, if enabled, causes an update of the shift up value for BIAS data (step S4.13).

The steps are synchronised at the end of each row (step S4.14). For enabled input channels, if needed, data transfer takes place in the foreground from memory 2 via the input DMA module 51 to the channel input buffers $52_1, \ldots, 52_k$ for defined number of pixel rows in foreground (step S4.15). Layer set processing continues until all the rows processed (step S4.16).

Once all the rows are processed, for enabled output channels, if needed, data transfer takes place in the foreground from the output buffers $64_1, 64_2$, via the output DMA module 65 to memory 5 for one pixel row (step S4.17). A flag (SYNCS) may be set to signal that the channel set has been processed.

Channel set processing continues for each tile (step S5) and each layer (step S6) until processing of a layer has been completed. Then, the command issue unit 34 executes a layer epilog control (step S7).

Figure 30:
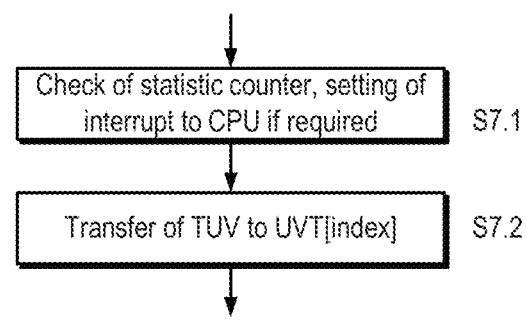
FIG. 30 is a process flow diagram of a method of completing layer processing.

Referring in particular to FIGS. 10, 16 and 30, the command issue unit 34 checks the statistics counter and, generates an interrupt if required (step S7.1). The command issue unit 34 transfers a temporary update value (TUV) to the UV table 51 for the layer index.

Once all the layers for a picture have been processed (step S8), the command issue unit 34 executes picture epilog control (step S9).

Figure 31:
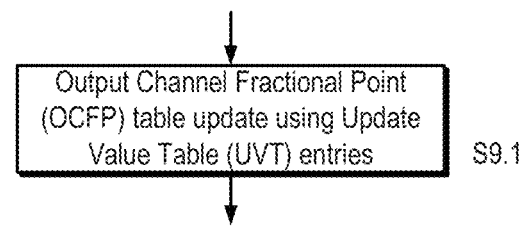
FIG. 31 illustrates updating an output channel fractional point table.
Figure 32:
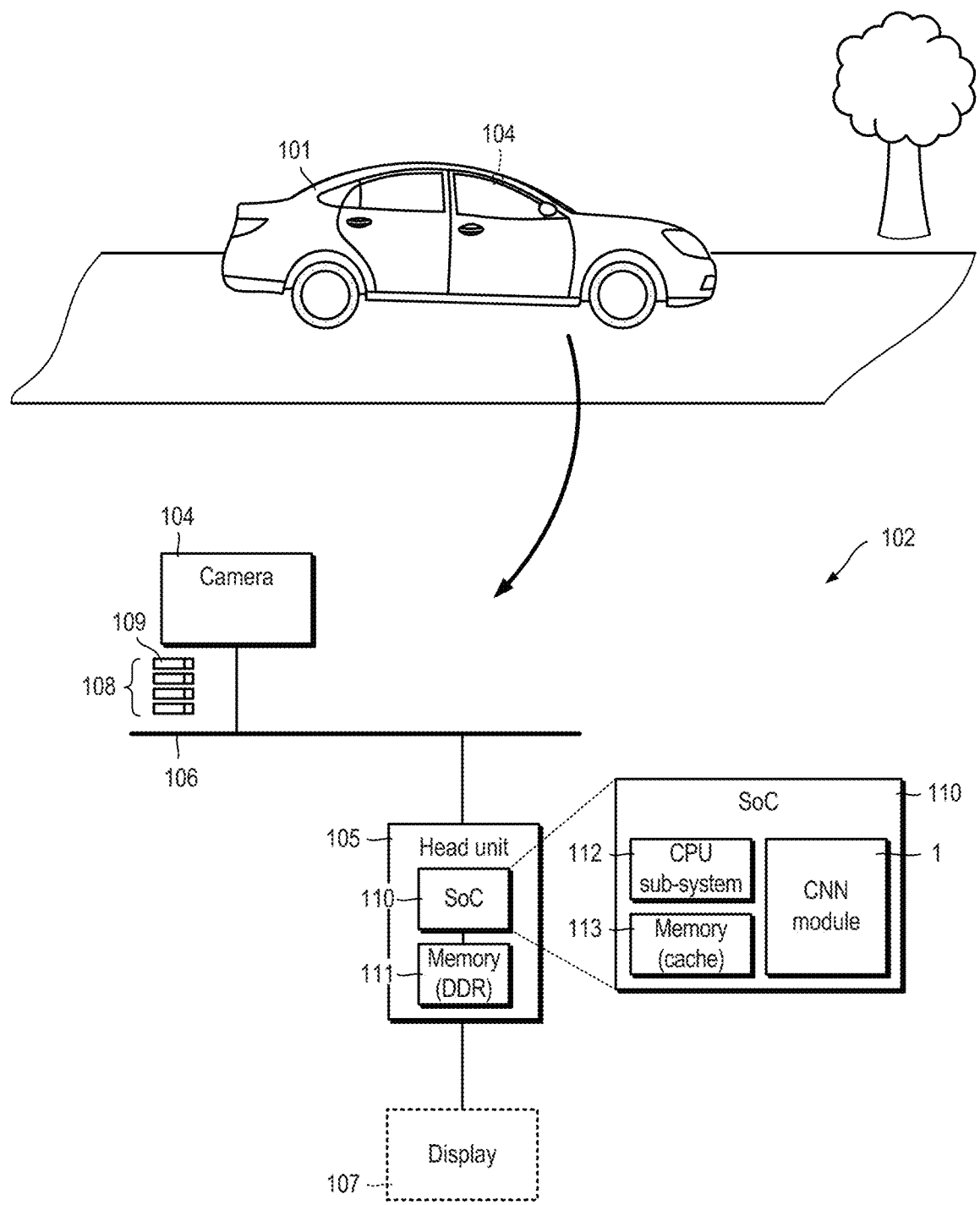
FIG. 32 illustrates a motor vehicle which comprising a system which includes a CNN hardware module.

Referring in particular to FIGS. 10, 16 and 31, the command issue unit 34 causes the OCFP table 32 update using the UV table entries (step S9.1).

ADAS System 101

Figure 25:
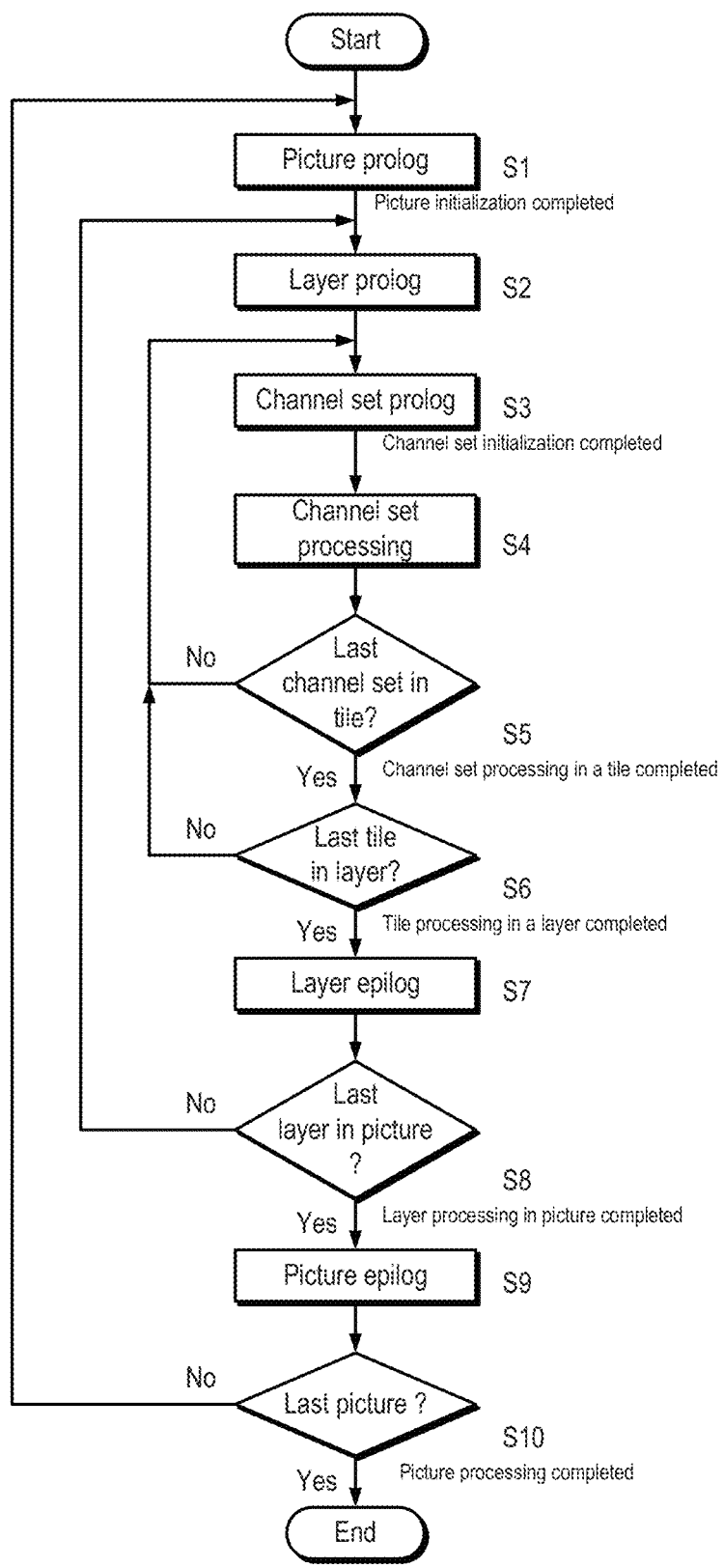
FIG. 25 is a process flow diagram of a method of controlling the CNN hardware module shown in FIG. 16.

Referring to FIG. 25, a motor vehicle 101 is shown.

The motor vehicle 101 includes an advanced driver assistance system (ADAS) 102 or autonomous car system (not shown) which performs semantic segmentation to classify objects (such as the road, cars, pedestrians, trees etc.) in images 103 captured by an on-board digital camera 104.

The system 102 includes a head unit 105 connected to an in-vehicle communications bus 106. The system 102 may include a display 107 connected to the head unit 105 is connected to a display 6. The display 107 can take the form of a flat-panel display located, for example, in a centre console (not shown) or dashboard (not shown).

The digital camera 104 is capable of capturing images in a sequence of image frames 103 (or "pictures") for example, at a rate of 60 fps. The image frame 103 is transmitted in one or more data frames 109 via the in-vehicle communications bus 106 to the head unit 105.

The head unit 105 includes a system-on-a-chip (SoC) no or other similar microprocessor-based system and memory 111. The SoC no includes a central processing unit (CPU) subsystem 112 which includes CPU 33 (FIG. 10), scratchpad memory 113 and the CNN module 1 in the form of a hardware-implemented peripheral module. The microcontroller no includes other peripheral modules, such as other communications network controllers (for other different types of communications network), timers etc.

The images 103 are temporarily stored in memory 112 and are processed in real-time by the CNN module 1 to perform semantic segmentation.

Modifications

It will be appreciated that various modifications may be made to the embodiments hereinbefore described. Such modifications may involve equivalent and other features which are already known in the design, manufacture and use of convolutional neural networks and component parts thereof and which may be used instead of or in addition to features already described herein. Features of one embodiment may be replaced or supplemented by features of another embodiment.

The system can be used in other applications, for example, in a manufacturing plant.

The number, configuration and/or implementation of the convolutional layers, pooling/sub-sampling layers and other layers may differ.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A hardware circuit in which integer numbers are used to represent fixed-point numbers having an integer part and a fractional part, the hardware circuit comprising:
   a multiply-accumulate unit configured to perform convolution operations using input data and weights and, in dependence thereon, to generate two or more intermediate results, each intermediate result provided to a separate output channel;
   a bias bit shifter configured to shift a bias value bitwise by a bias shift value so as to provide a bit-shifted bias value for each output channel;
   a carry bit shifter configured to shift a carry value bitwise by a carry shift value so as to provide a bit-shifted carry value for each output channel;
   an adder tree configured to add the intermediate result, the bit-shifted bias value and the bit-shifted carry value so as to provide a multiple-accumulate result within each output channel;
   a multiply-accumulate bit shifter configured to shift the multiple-accumulate result bitwise by a multiply-accumulate shift value so as to provide a bit-shifted multiply-accumulate result within each output channel; and
   a post-processing stage configured to receive the bit-shifted multiply-accumulate result within each output channel and, in dependence thereon, to generate output data;
   wherein the hardware circuit is configured to receive a set of input data as a series of portions of data and, for each portion of data, to generate a corresponding portion of output data, and
   wherein the hardware circuit further comprises:
      a maximum/minimum handler configured to count, in a given set of output data, first and second numbers of values of output data that exceed a first threshold or fall below a second threshold respectively and to determine:
         whether the first number exceeds a third threshold and, if so, to output a first value stored in a first table indicative of whether the first number exceeds the third threshold for the given set of input data;
         whether the second number exceeds a fourth threshold and, if so, to output the first value stored in the first table indicative of whether the second number exceeds the fourth threshold for the given set of input data; and
         whether neither or both of the first and second numbers exceed the third and fourth thresholds respectively and, if so, to output the first value stored in the first table indicative of whether neither or both of the first and second numbers exceed the third and fourth thresholds respectively for the given set of input data; and
      a controller configured to update a second value stored in a second table to be used for the next set of input data in dependence of the first value, and to set the bias shift value, the carry shift value and the multiply-accumulate shift value in dependence on the updated second value.

2. The hardware circuit according to claim 1, further comprising:
   a bias value register arranged to provide the bias value to the bias bit shifter.

3. The hardware circuit according to claim 1, further comprising:
   a carry value register arranged to provide the carry value to the carry bit shifter.

4. The hardware circuit according to claim 1, comprising:
   a MAC array module comprising the multiply-accumulate unit, the bias bit shifter and the carry bit shifter.

5. The hardware circuit according to claim 4, further comprising:
   weights registers for providing the weights to the MAC array;
   input registers for providing input data to the MAC array; and
   carry registers for providing carry data to the MAC array.

6. The hardware circuit according to claim 1, wherein the post-processing stage comprises:
   a rectified linear unit module.

7. The hardware circuit according to claim 1, wherein the post-processing stage comprises:
   a ranking module.

8. The hardware circuit according to claim 1, wherein the post-processing stage comprises:
   a down sampling module.

9. The hardware circuit according to claim 1, wherein the post-processing stage comprises:
   input registers.

10. A convolutional neural network module comprising the hardware circuit according to claim 1.

11. An integrated circuit comprising the hardware circuit according to claim 1.

12. The integrated circuit according to claim 11, which is a system-on-chip (SoC) or microcontroller which further comprises a CPU subsystem in communication with the convolutional neural network module.

13. The integrated circuit according to claim 12, further comprising memory.

14. A head unit comprising the integrated circuit according to claim 13.

15. The head unit according to claim 14 operable to receive images from a digital camera and to pass the images to the hardware circuit.

16. A system comprising:
   a head unit according to claim 14; and
   a digital camera configured to transmit images to the head unit for processing by the hardware circuit.

17. The system according to claim 16, further comprising:
   a communications bus for transmitting images from the digital camera to the head unit.

18. The system according to claim 17, which is a driver or operator assistance system.

19. A vehicle comprising the driver assistance system according to claim 18.

20. The vehicle according to claim 19, wherein the vehicle is a motor vehicle.

* * * * *